United States Patent
Taylor, Jr. et al.

(10) Patent No.: US 11,452,269 B2
(45) Date of Patent: Sep. 27, 2022

(54) RAIL TUNED PRESSURE RESPONSIVE IRRIGATION EMITTER

(71) Applicant: The Toro Company, Bloomington, MN (US)

(72) Inventors: William C. Taylor, Jr., El Cajon, CA (US); Charles G. Schmid, Santee, CA (US); Daniel Trinidad, Escondido, CA (US); David S. Martin, Bonita, CA (US); Michael R. Knighton, Lakeside, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 16/884,494

(22) Filed: May 27, 2020

(65) Prior Publication Data
US 2020/0390042 A1 Dec. 17, 2020

Related U.S. Application Data

(60) Provisional application No. 62/861,393, filed on Jun. 14, 2019.

(51) Int. Cl.
*A01G 25/02* (2006.01)

(52) U.S. Cl.
CPC .................. *A01G 25/023* (2013.01)

(58) Field of Classification Search
CPC .............................. A01G 25/023; A01G 25/02
USPC .... 239/533.1, 542, 547, 562, 566, 569, 571, 239/570
See application file for complete search history.

(56) References Cited

U.S. PATENT DOCUMENTS

| | | | |
|---|---|---|---|
| 4,307,841 A | 12/1981 | Mehoudar et al. | |
| 4,642,152 A | 2/1987 | Chapin | |
| 4,687,143 A | 8/1987 | Gorney et al. | |
| 4,728,042 A | 3/1988 | Gorney et al. | |
| 5,829,685 A | 11/1998 | Cohen | |
| 5,829,686 A | 11/1998 | Cohen | |
| 6,250,571 B1 | 6/2001 | Cohen | |
| 6,308,902 B1 | 10/2001 | Huntley | |
| 6,371,390 B1 | 4/2002 | Cohen | |
| 6,382,530 B1 | 5/2002 | Perkins | |
| 6,464,152 B1 | 10/2002 | Bolinis et al. | |
| 6,568,607 B2 | 5/2003 | Boswell et al. | |
| 6,581,854 B2 | 6/2003 | Eckstein | |
| 6,736,337 B2 * | 5/2004 | Vildibill | A01G 25/023 239/533.13 |

(Continued)

FOREIGN PATENT DOCUMENTS

| EP | 0710155 | 9/1996 |
|---|---|---|
| EP | 1951438 | 8/2008 |

(Continued)

*Primary Examiner* — Qingzhang Zhou
*Assistant Examiner* — Joel Zhou
(74) *Attorney, Agent, or Firm* — Dicke, Billig & Czaja, PLLC

(57) ABSTRACT

An emitter comprising a pressure responsive section and at least one feature defined by a floor, a first rail, and a second rail. The at least one feature being tuned by at least one of rail to rail distance, rail height, rail width, rail corner, vertical rail gap, transverse rail gap, external rail, floor thickness, floor profile, tip height, tip clearance, feature density, feature contour, feature angle, and feature thickness.

31 Claims, 31 Drawing Sheets

(56) References Cited

U.S. PATENT DOCUMENTS

| | | |
|---|---|---|
| 6,886,761 B2 | 5/2005 | Cohen |
| 7,735,758 B2 | 6/2010 | Cohen |
| 7,887,664 B1 | 2/2011 | Mata et al. |
| 8,317,111 B2 * | 11/2012 | Cohen ................. A01G 25/023 |
| | | 239/542 |
| 8,348,182 B2 | 1/2013 | Keren |
| 8,469,294 B2 | 6/2013 | Mata et al. |
| 8,998,112 B2 | 4/2015 | Cohen |
| 9,307,705 B2 | 4/2016 | Akritanakis |
| 9,380,749 B2 | 7/2016 | Akritanakis |
| 9,485,923 B2 * | 11/2016 | Ensworth ............. A01G 25/023 |
| 9,877,440 B2 | 1/2018 | Ensworth et al. |
| 9,877,441 B2 | 1/2018 | Ensworth et al. |
| 2003/0150940 A1 | 8/2003 | Vildibill et al. |
| 2005/0258279 A1 | 11/2005 | Harrold |
| 2015/0296723 A1 | 10/2015 | Jain et al. |
| 2016/0262319 A1 | 9/2016 | Defrank et al. |
| 2016/0295815 A1 | 10/2016 | Defrank et al. |
| 2018/0213732 A1 | 8/2018 | Ensworth et al. |

FOREIGN PATENT DOCUMENTS

| | | |
|---|---|---|
| WO | 9503130 | 2/1995 |
| WO | 9850167 | 11/1998 |
| WO | 0215670 | 2/2002 |
| WO | 03066228 | 8/2003 |
| WO | 2007052272 | 5/2007 |
| WO | 2015083032 A1 | 6/2015 |

* cited by examiner

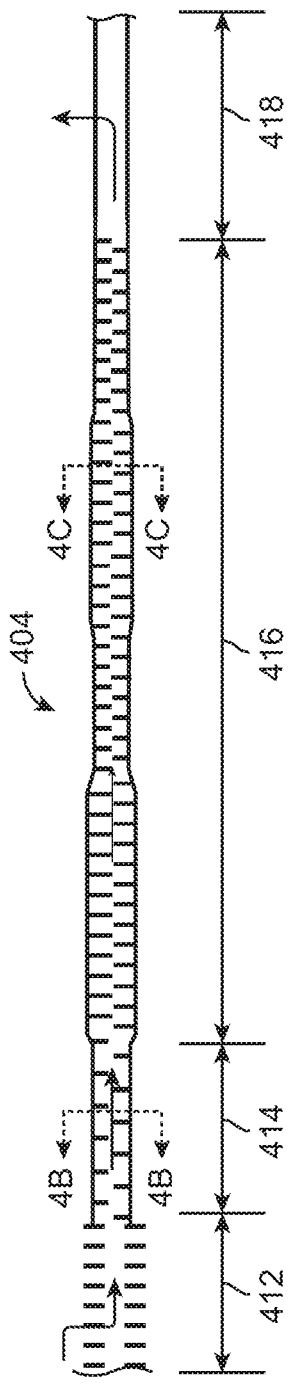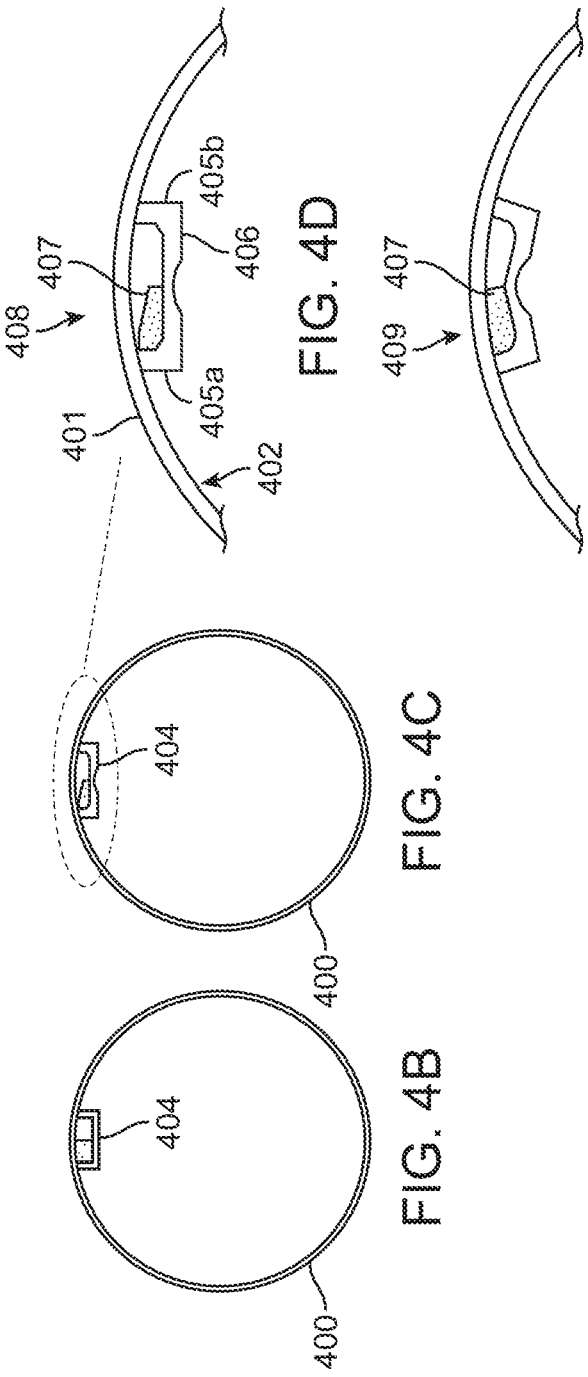

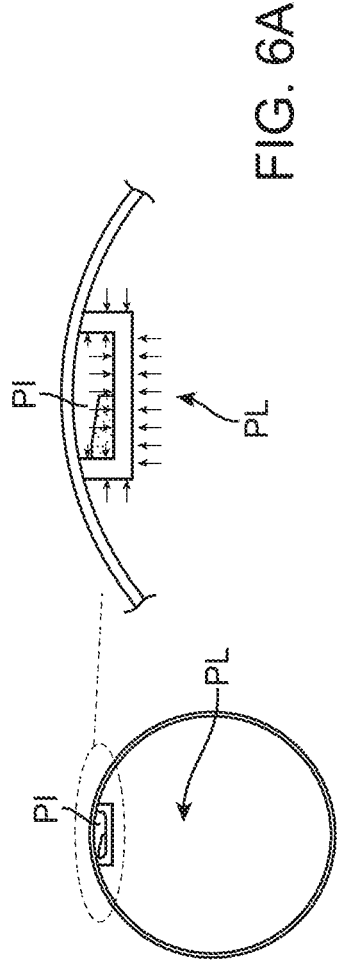

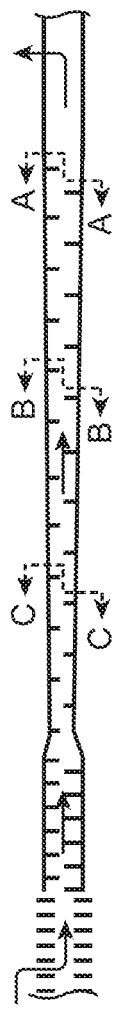
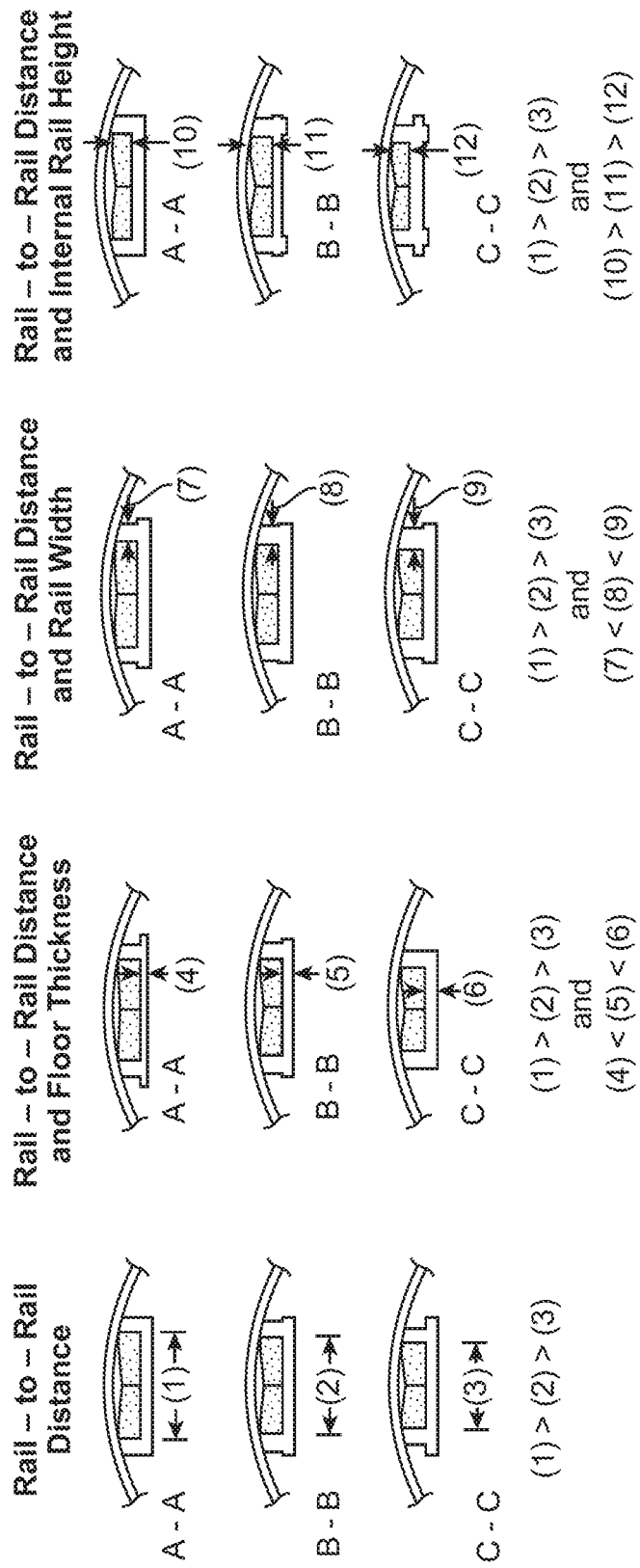
FIG. 7
FIG. 7A
FIG. 7B
FIG. 7C
FIG. 7D

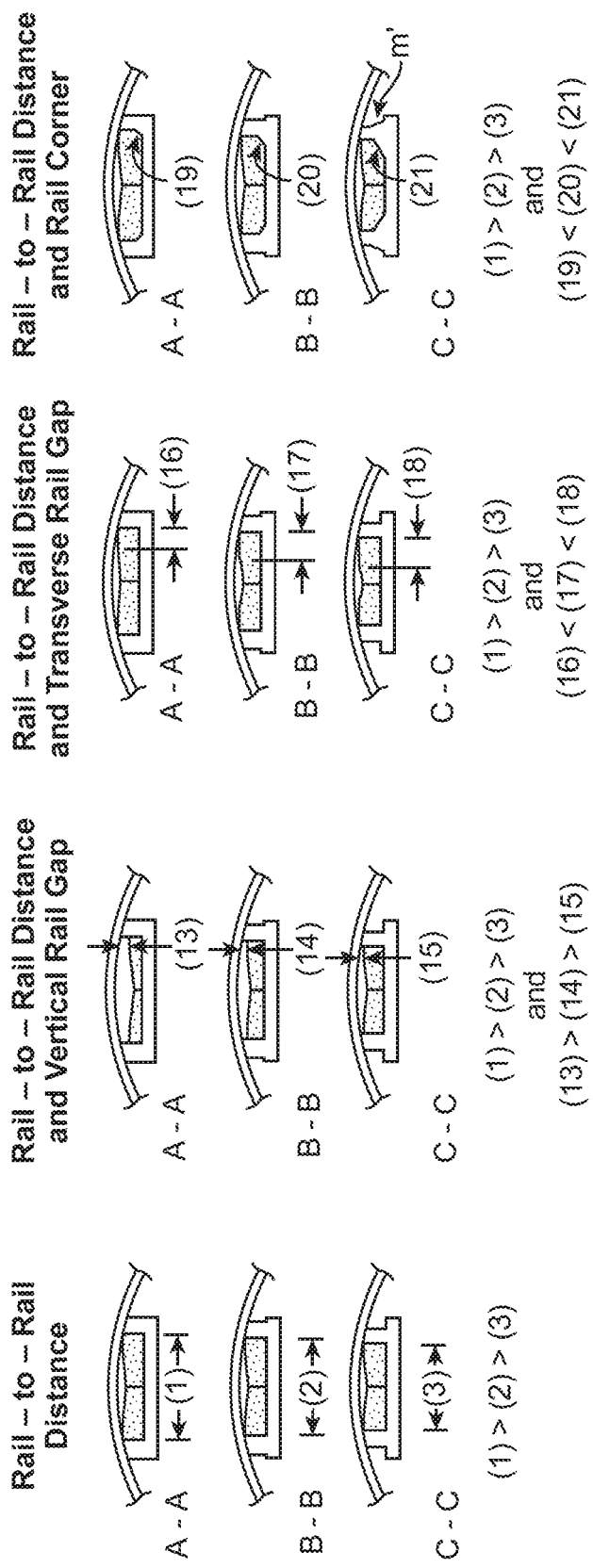

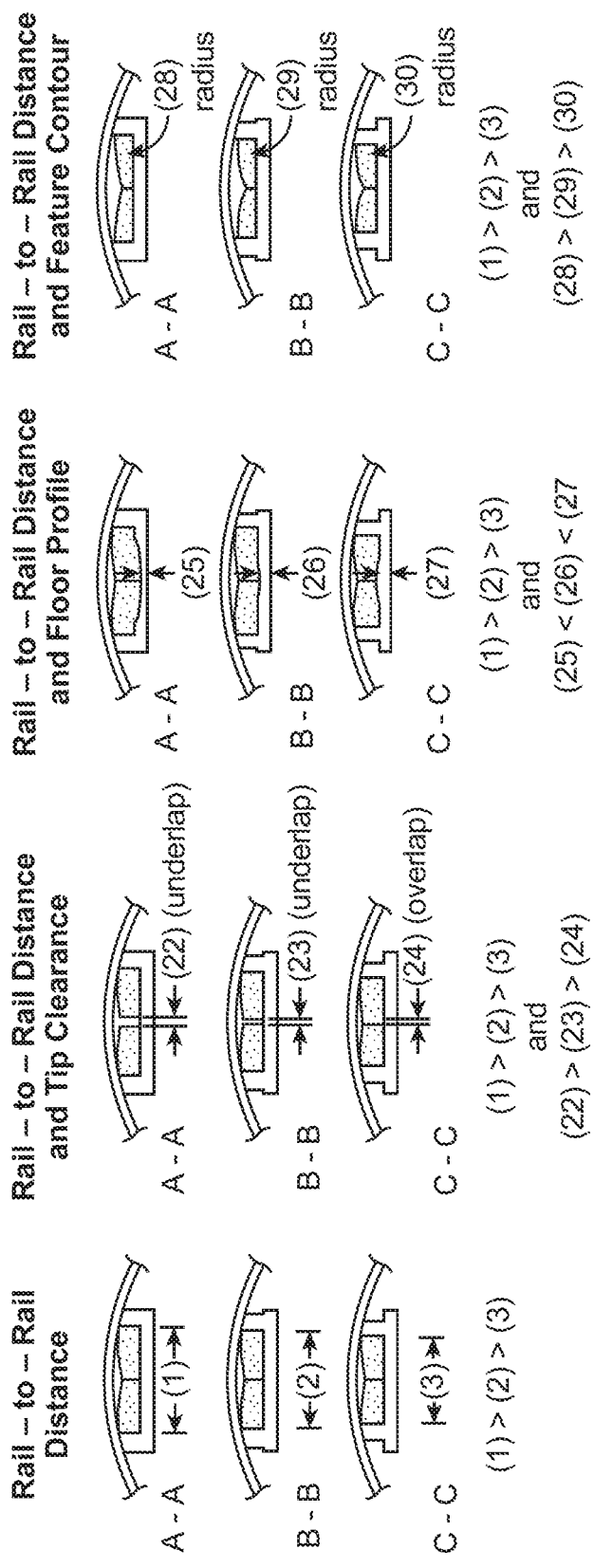

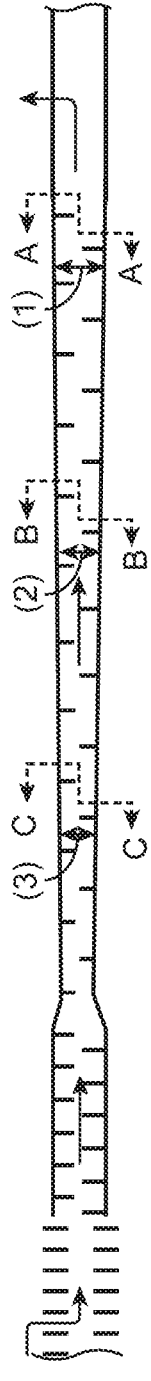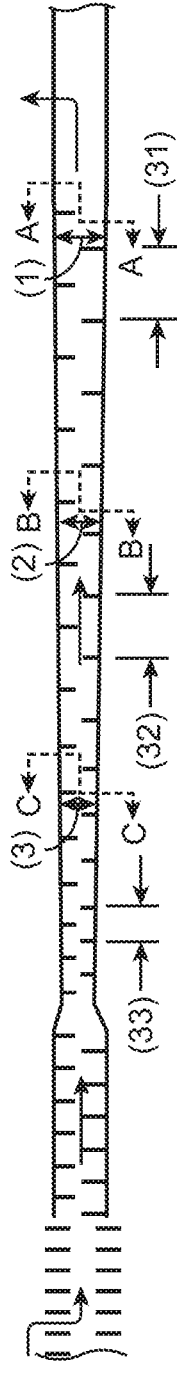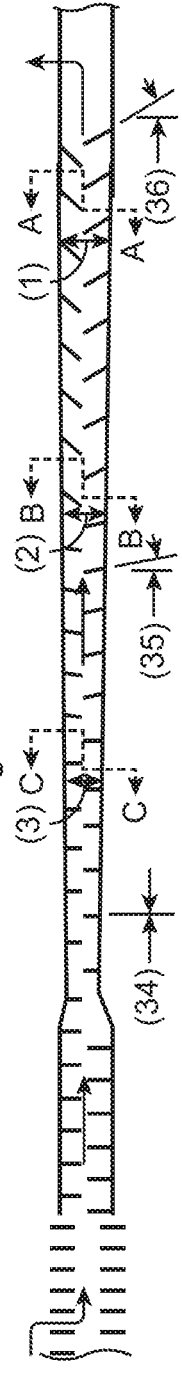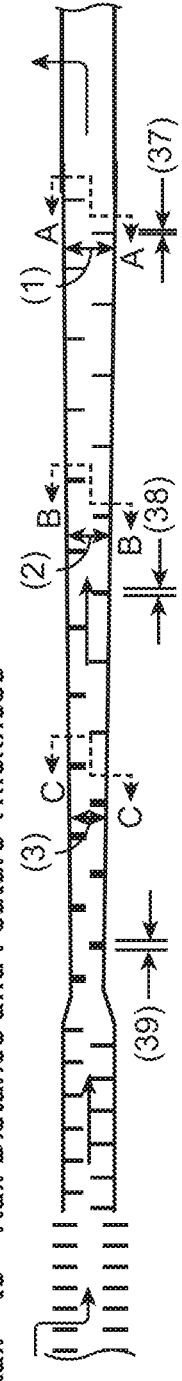

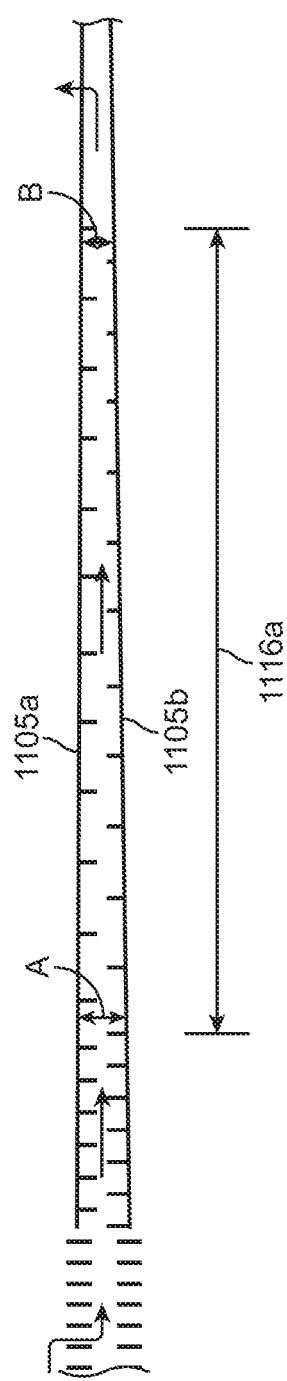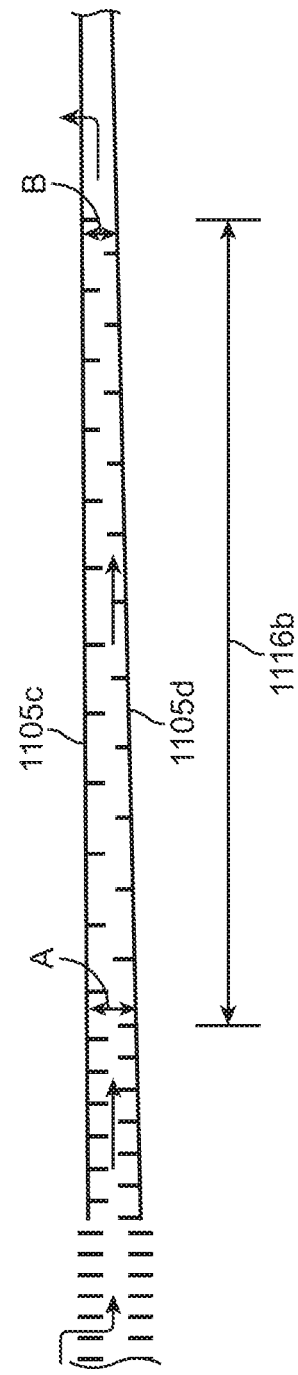

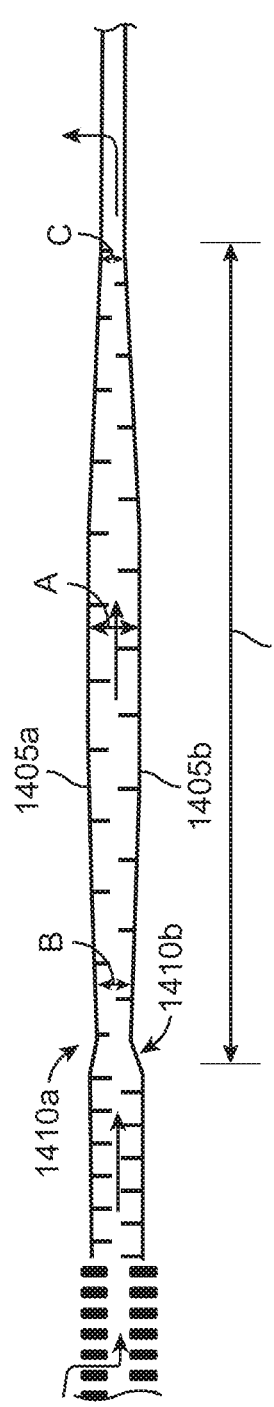
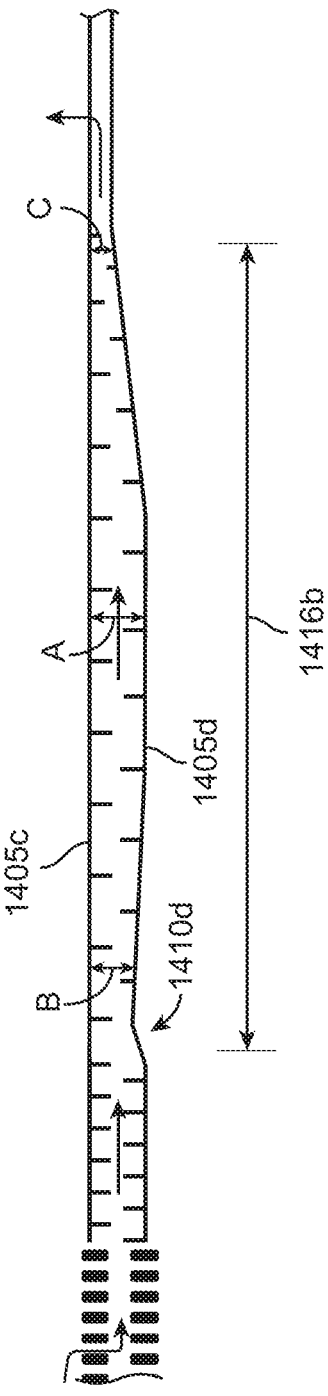
FIG. 14A
FIG. 14B

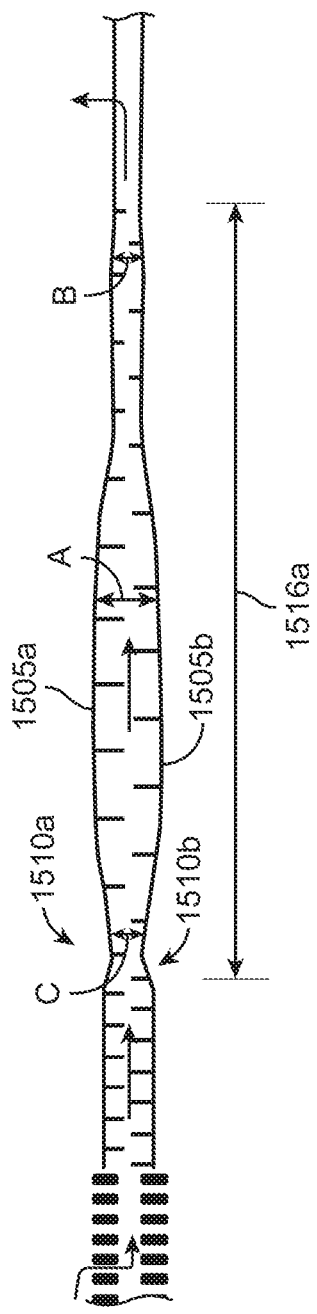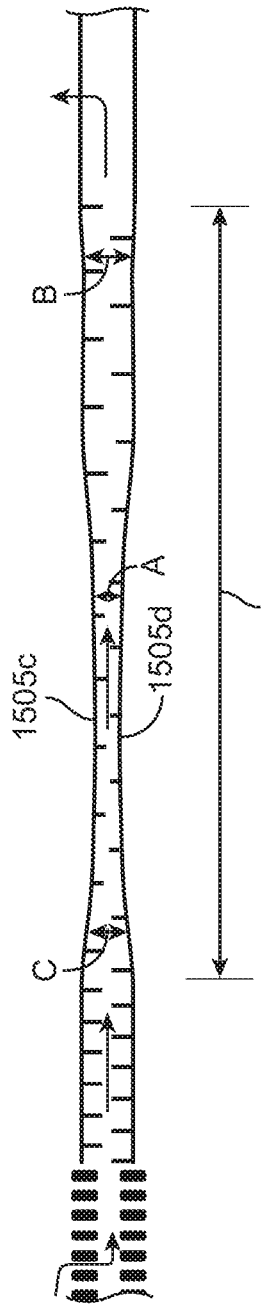
FIG. 15A
FIG. 15B

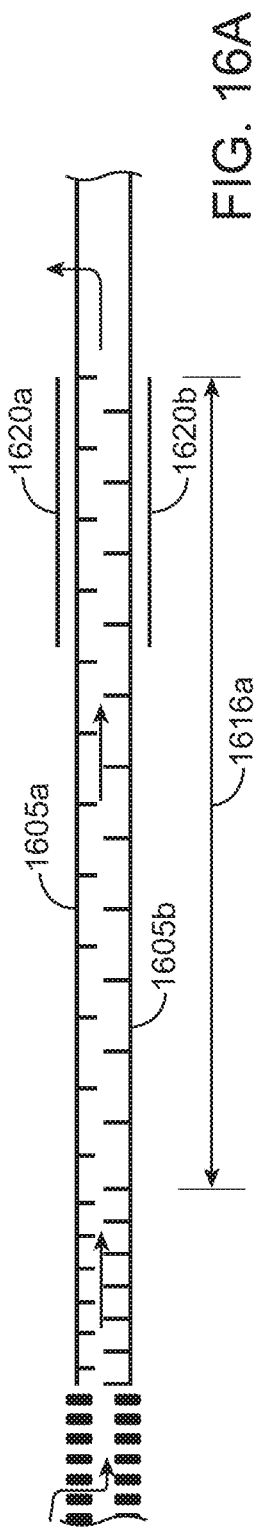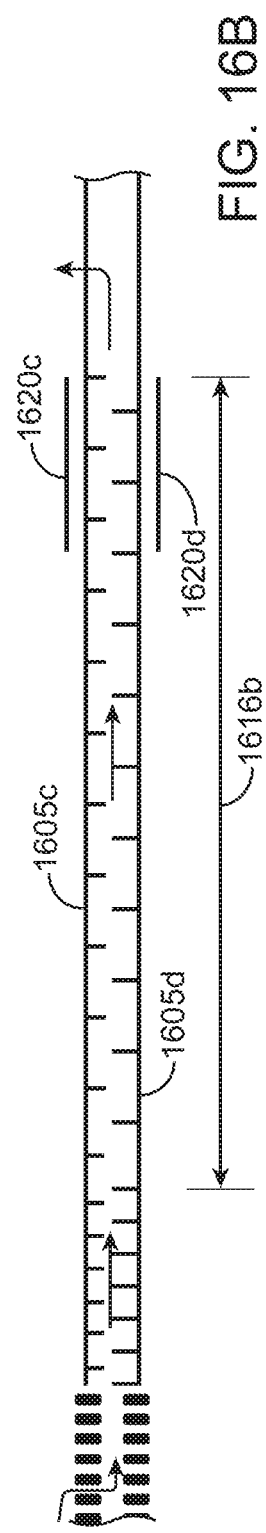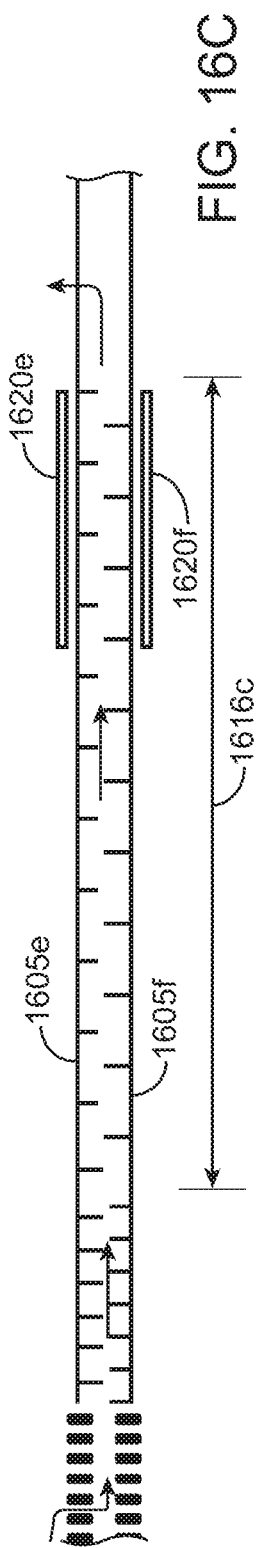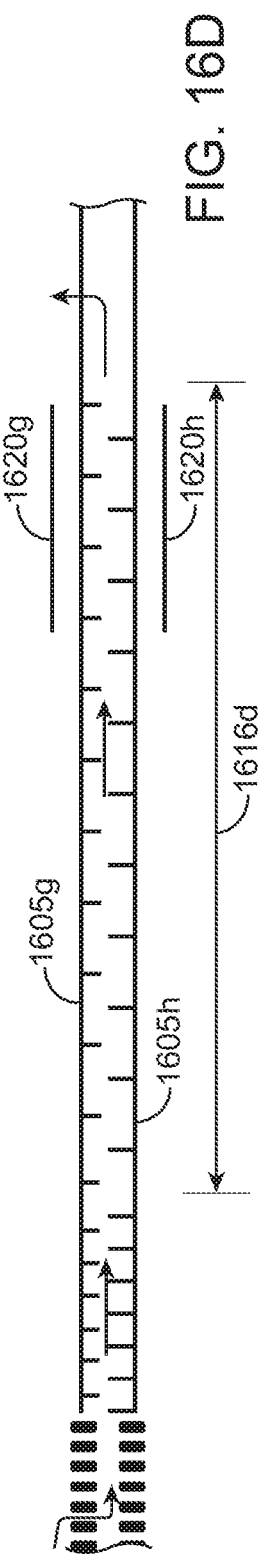

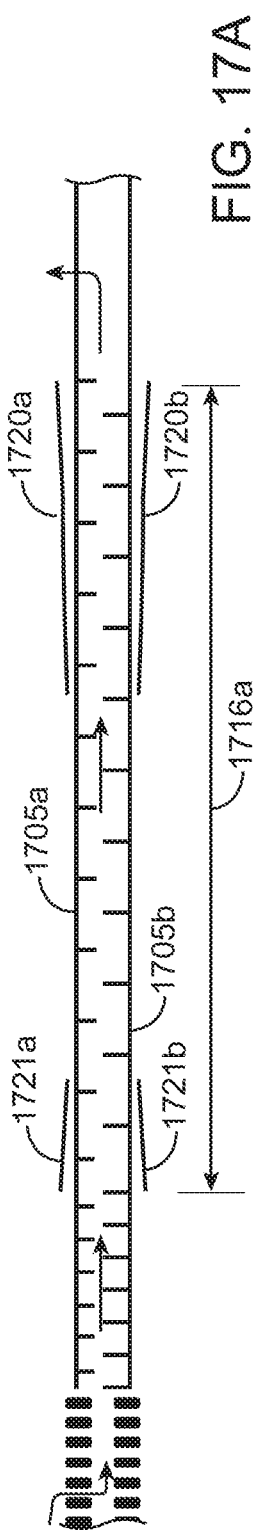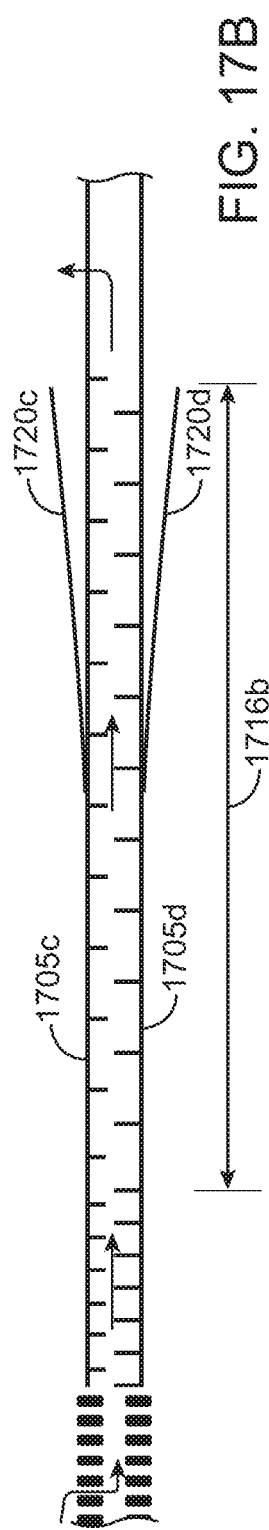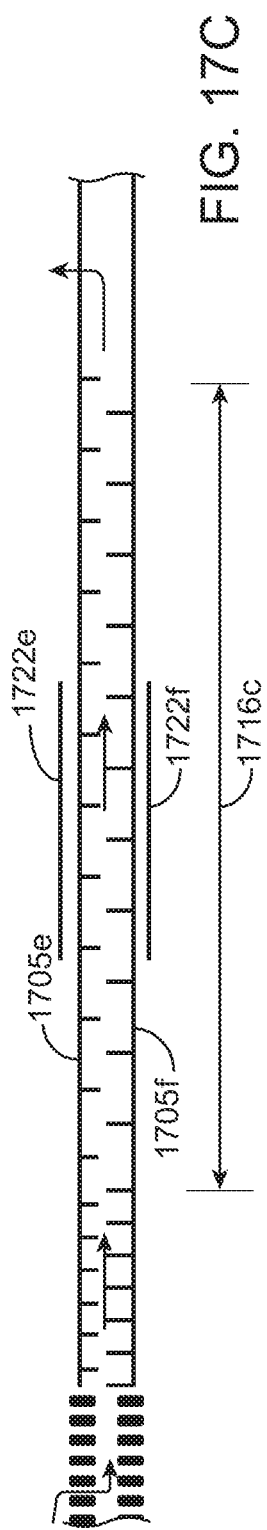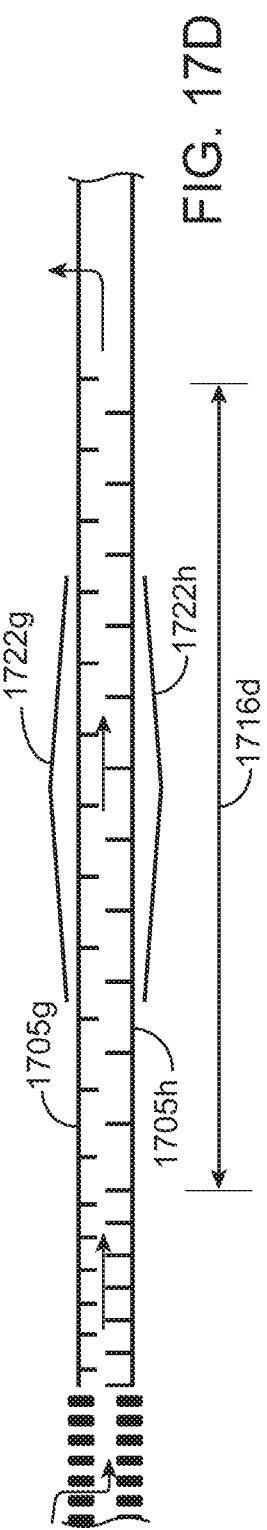

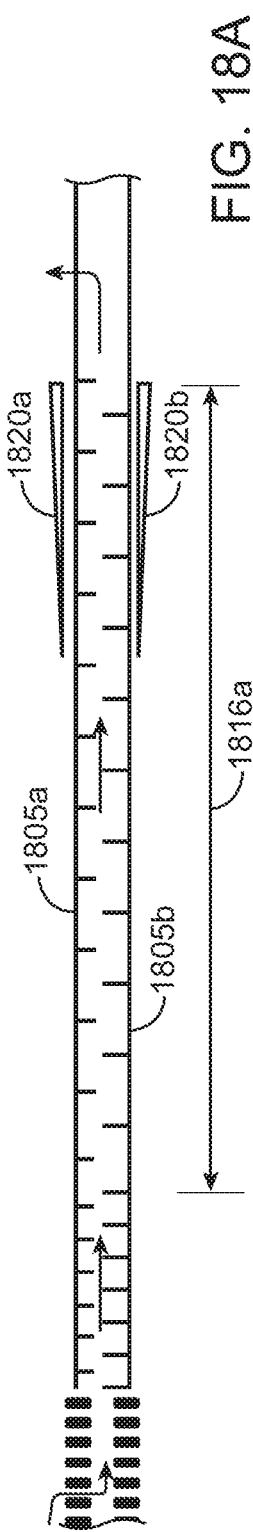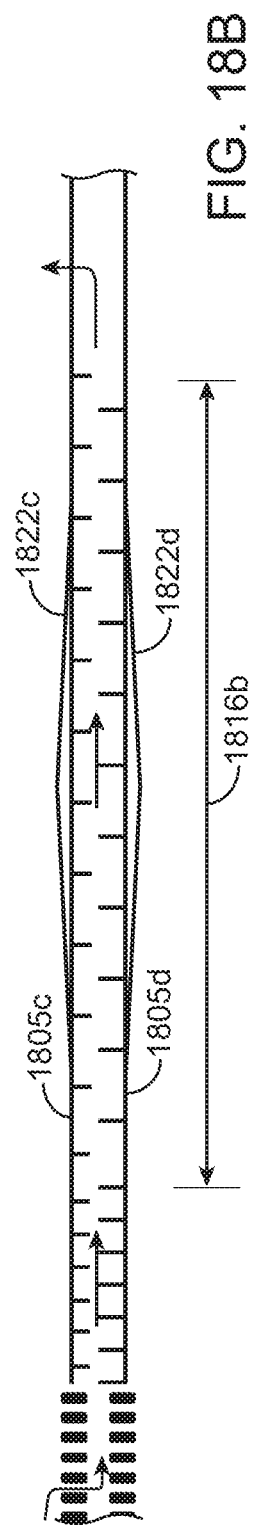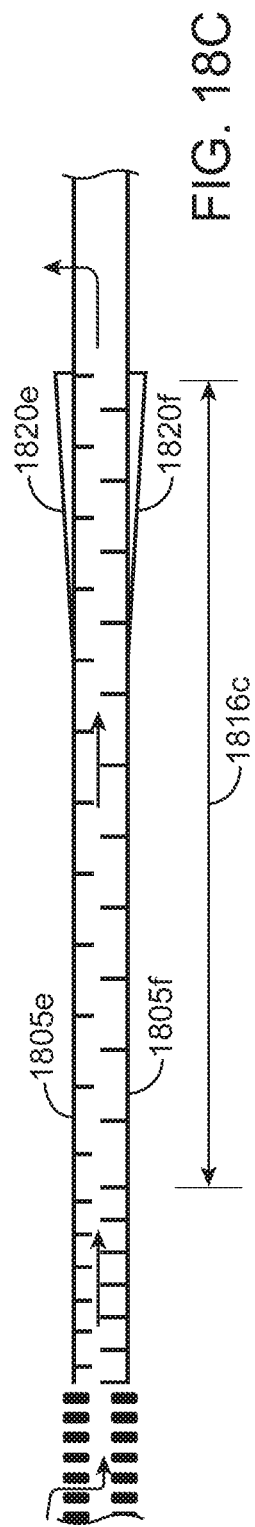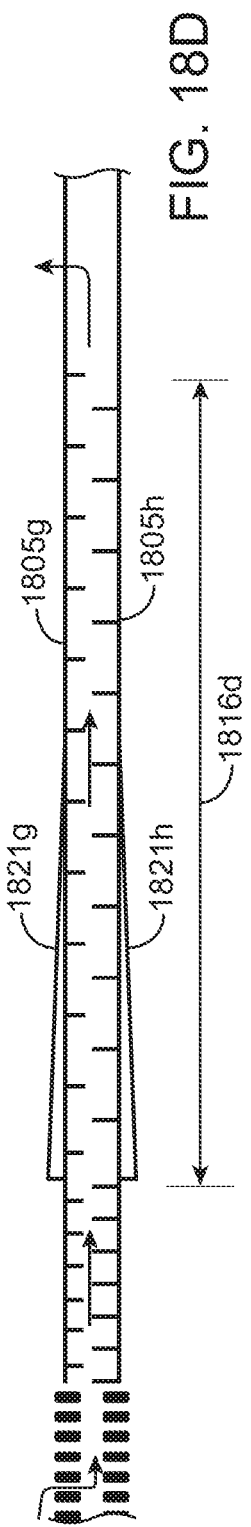

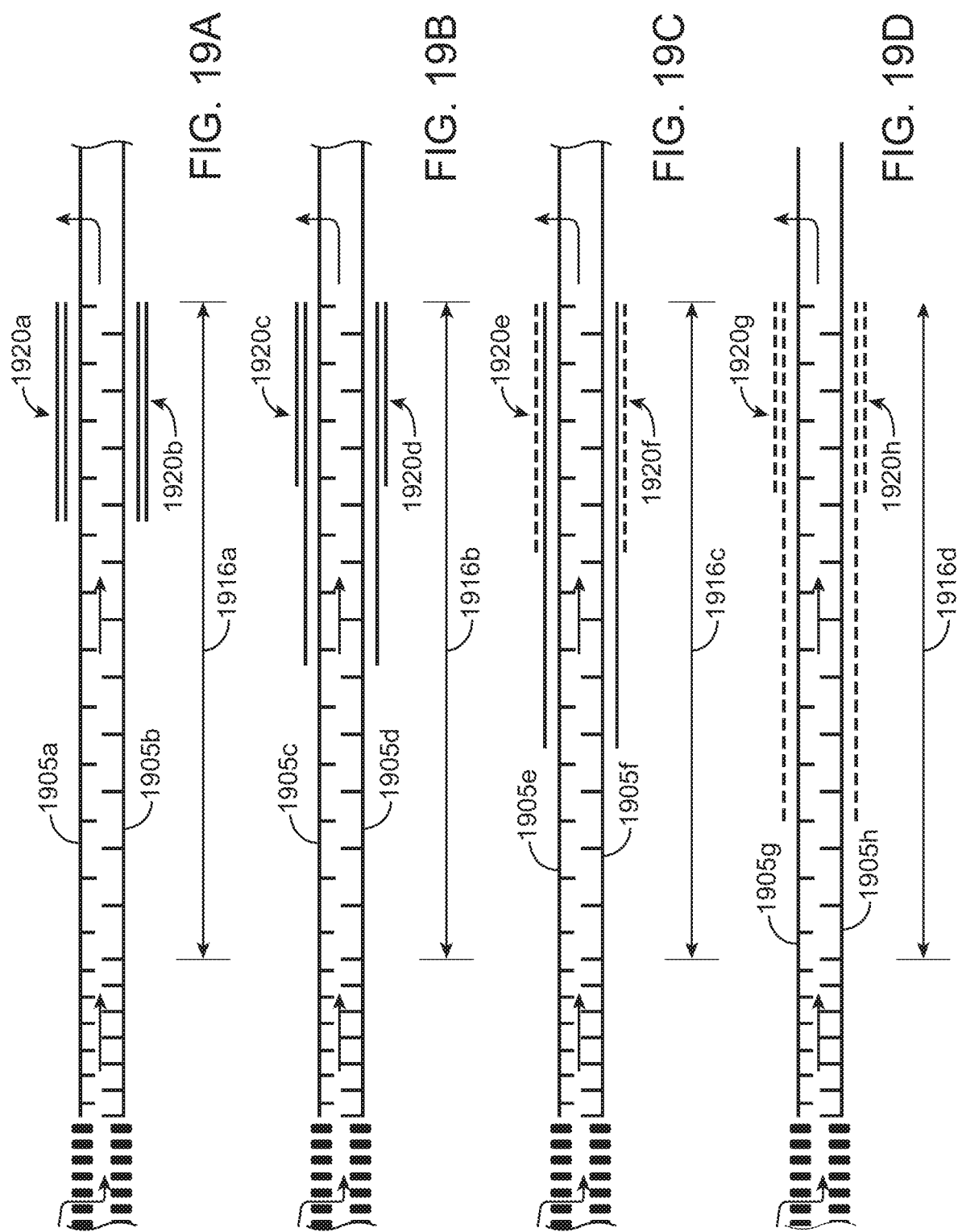

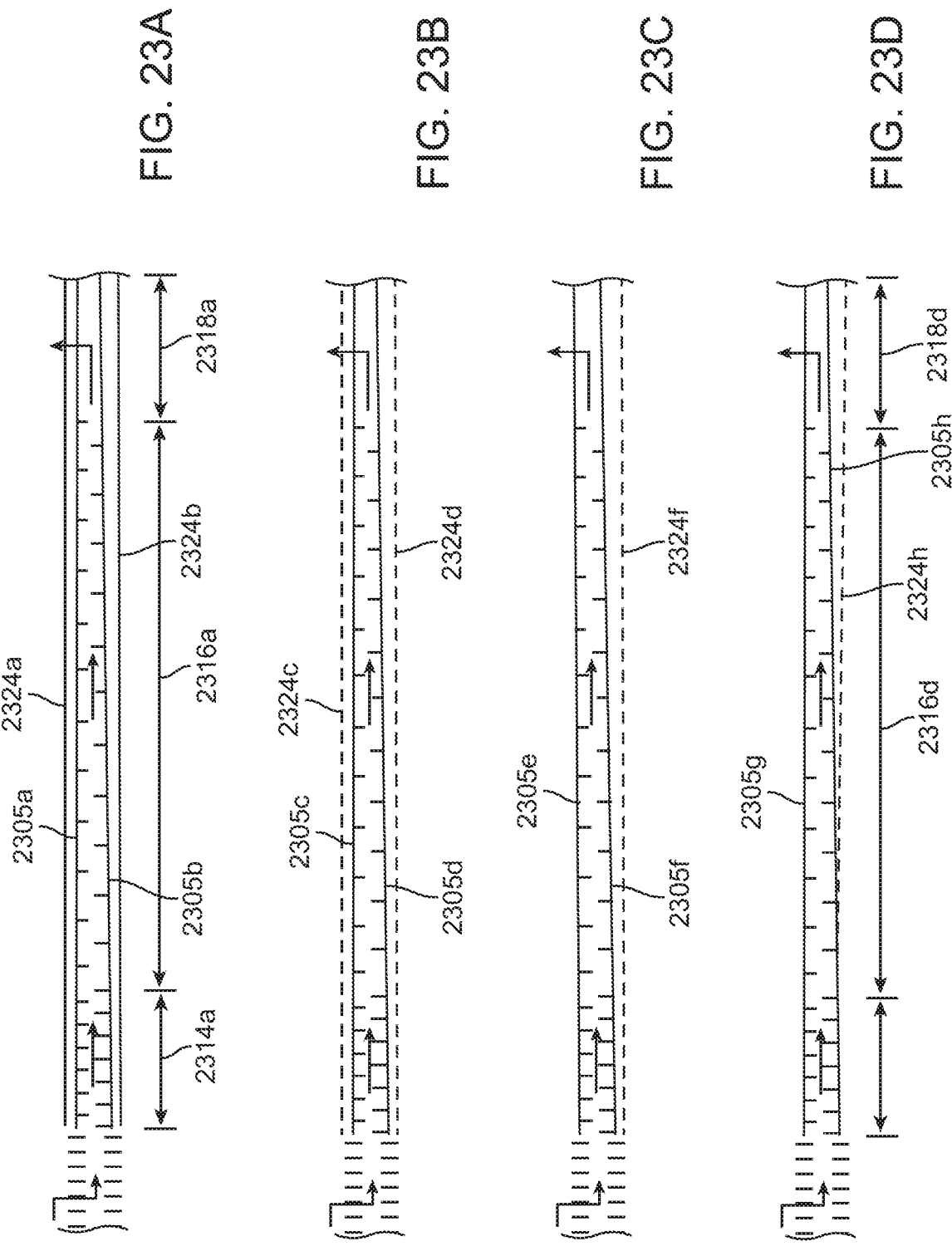

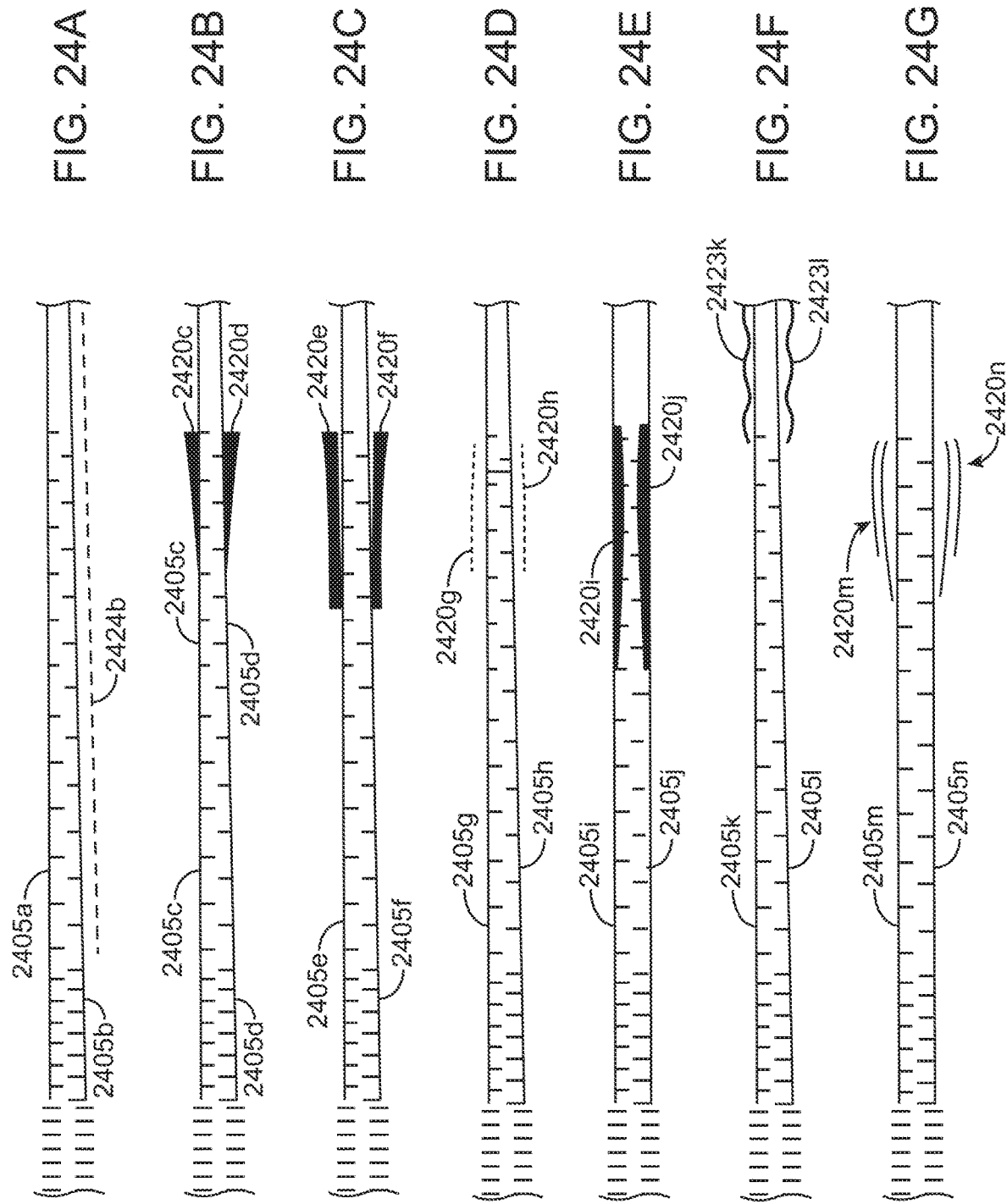

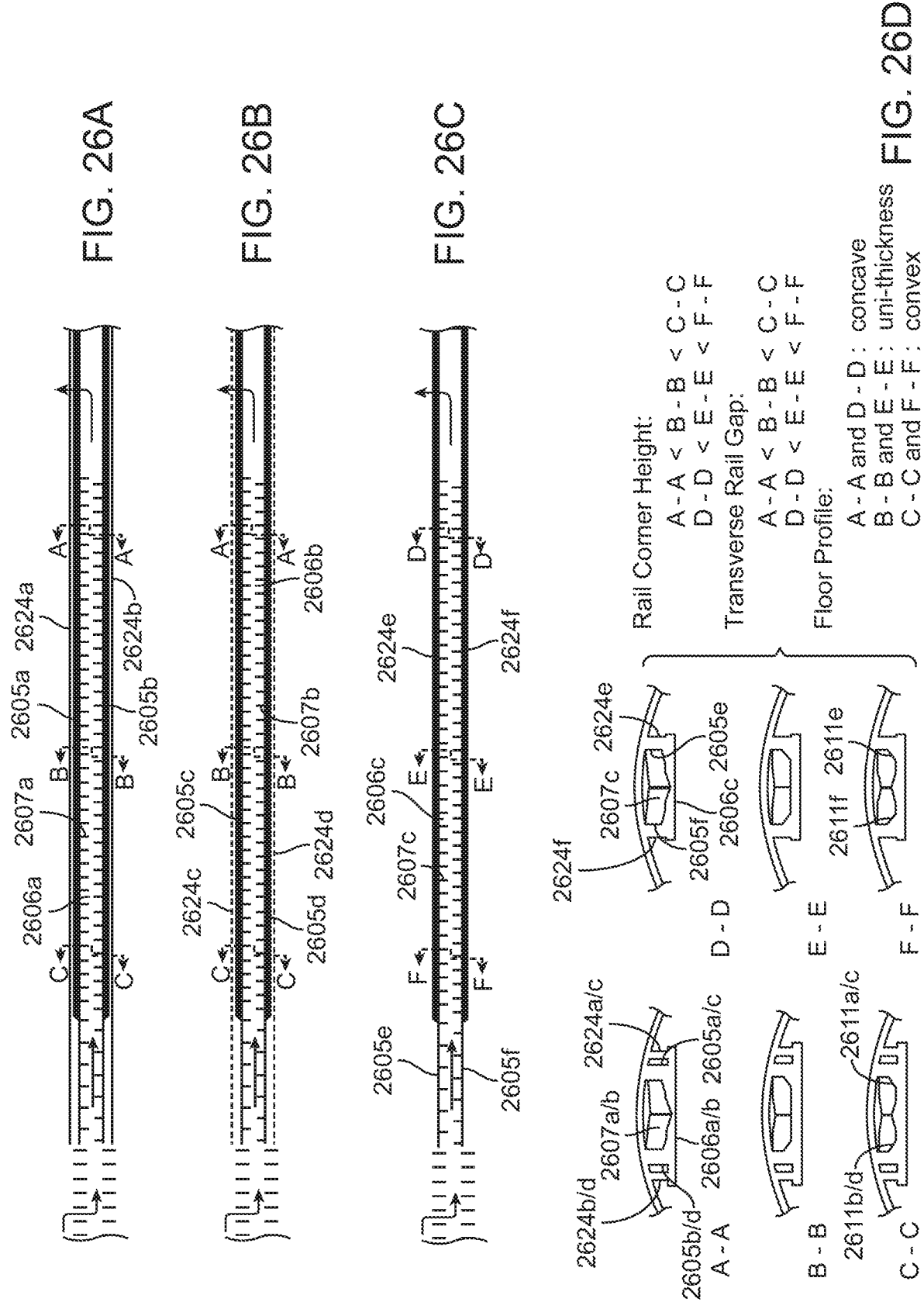

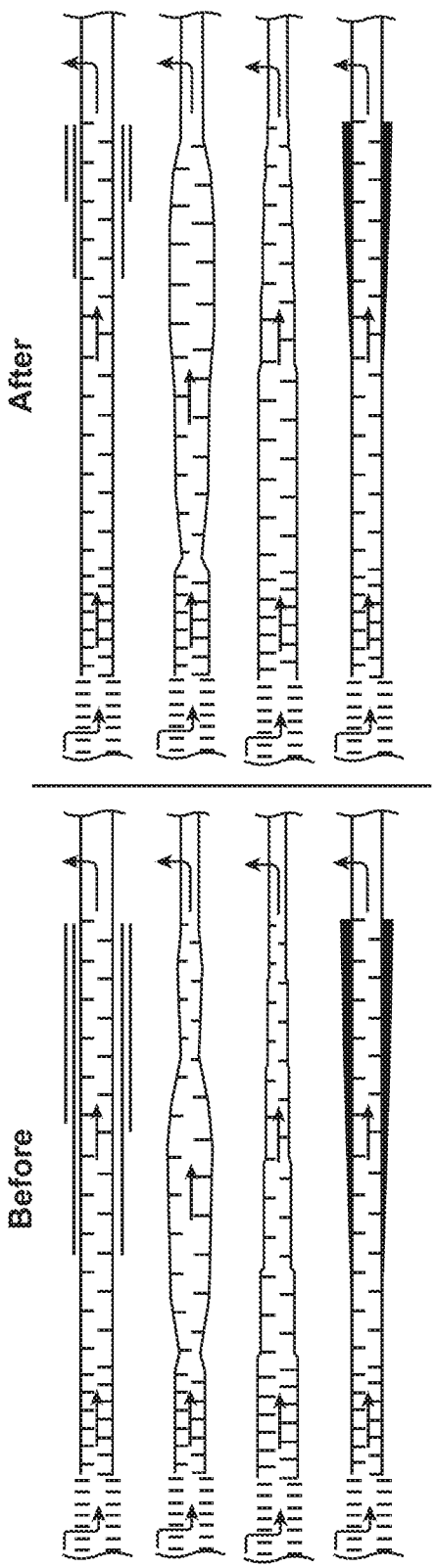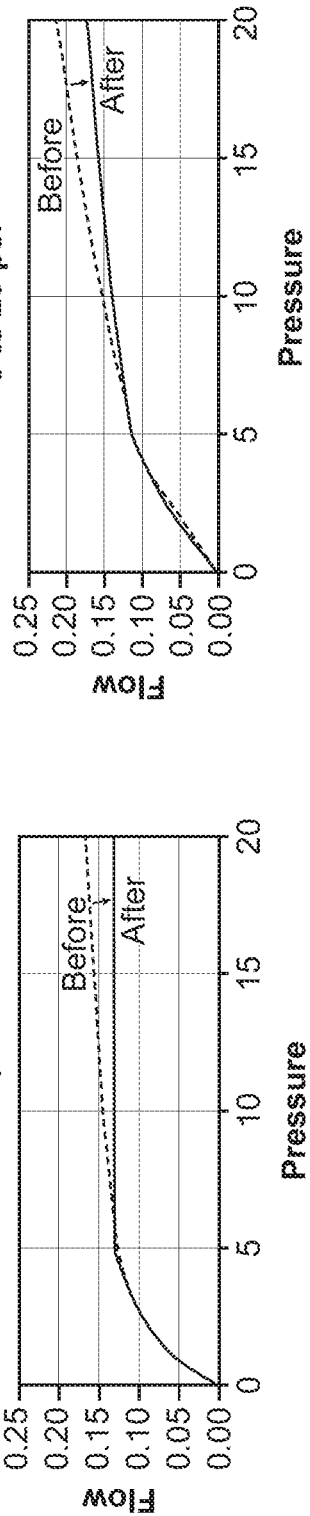
FIG. 27

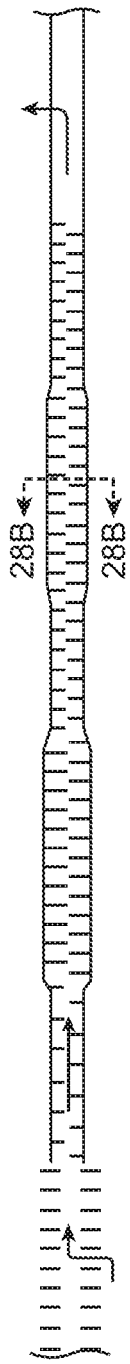
FIG. 28A
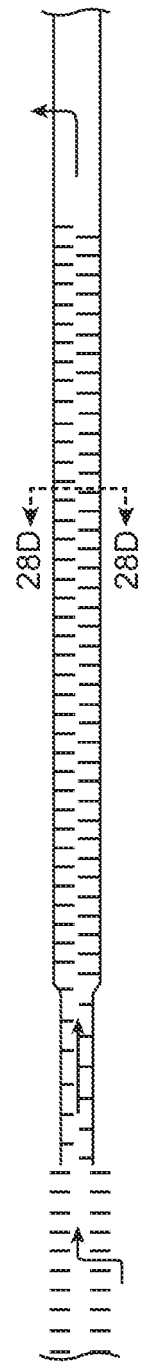
FIG. 28C
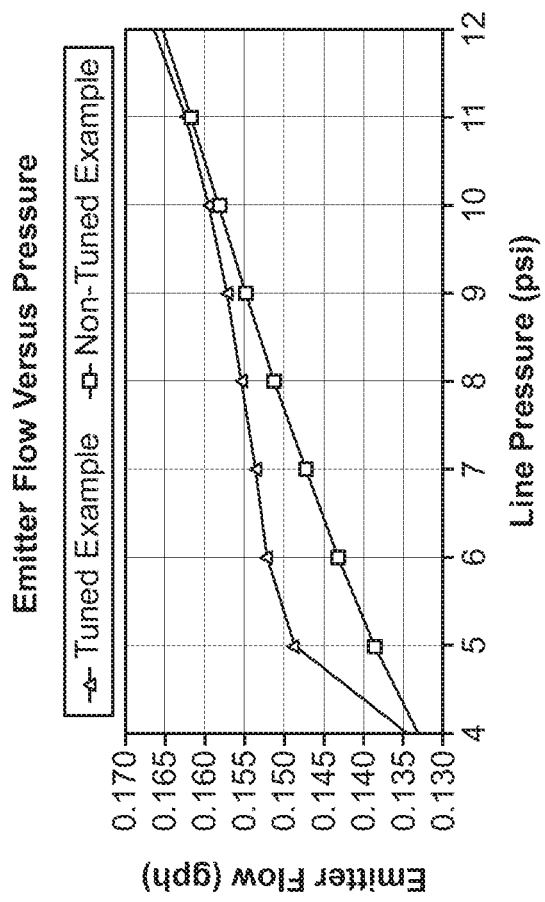
FIG. 28E
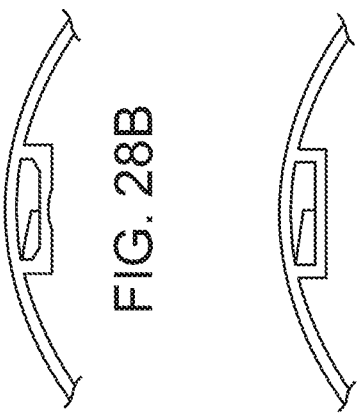
FIG. 28B
FIG. 28D

RAIL TUNED PRESSURE RESPONSIVE IRRIGATION EMITTER

CROSS-REFERENCE TO RELATED APPLICATIONS

This application claims the benefit of U.S. Provisional Application Ser. No. 62/861,393, filed Jun. 14, 2019, which is incorporated by reference in its entirety herein.

FIELD OF THE INVENTION

Embodiments of the invention generally relate to a continuous, in-line, pressure responsive emitter for irrigation applications such as drip irrigation applications.

BACKGROUND

A benefit of having thicker profile cross section emitters is a larger active range over which a diaphragm can move, and this enables a larger operating pressure range, but some commercially available discrete, in-line pressure compensating emitters extend downward substantially into the fluid passageway of the irrigation lateral (e.g., hose or tube). This creates a pressure drop within the overall tube itself. If, for example, an irrigation lateral had emitters every 6 inches and the lateral was 1000 feet in length, there would be 2000 emitters along the length of the lateral. This may lead to a substantial loss in pressure along the lateral and may reduce the benefit of having pressure compensating emitters to extend the length.

Lower profile cross section emitters such as continuous emitter strips used in some drip irrigation tapes or laterals create much smaller line losses over the length of the lateral. However, this may limit the working distance in terms of displacement in which a feature can move, especially if the design is limited in the number of features to dissipate pressure.

With some currently available continuous emitters, the ability to tune the response of the pressure responsive region with such a large number of features is limited. Commercially available fully compensating emitters (discharge exponent of 0 or near 0) rely upon a single regulating feature downstream of a short pressure reducing section. Example regulating features include slots or holes, often surrounded by an inverted conical section. In order to accommodate a full range of operating pressure, the resistance to flow of the regulating feature varies greatly. When exposed to upper portions of pressure range, in order to generate a desired resistance, the regulating feature moves to a position with greatly reduced cross sectional areas. This leads to a propensity for debris to build up when the minimal cross section feature acts like a filter, not allowing debris to pass.

The outlet chamber is exposed to atmospheric pressure, while the pressure on the underside of the elastomeric strip matches the line pressure. This exposes the elastomeric strip at the outlet location to full line pressure as a differential. This can have a tendency to distort the emitter floor upward into the outlet itself. This can lead to reduced cross sectional area, squirting and/or a higher tendency for plugging when exposed to debris within the irrigation water supply.

SUMMARY

An embodiment emitter comprises a pressure responsive section and at least one feature defined by a floor, a first rail, and a second rail. The at least one feature is tuned by at least one tuning element to deflect at desired differential pressures local to the at least one feature. The tuning element is selected from the group consisting of rail to rail distance, rail height, rail width, rail radius curvature, rail corner, vertical rail gap, transverse rail gap, external rail, floor thickness, floor profile, tip height, tip clearance, feature density, feature contour, feature angle, and feature thickness.

An embodiment combination irrigation lateral and emitter comprises a lateral and an emitter. The lateral has an inner wall, and a portion of the inner wall defines a lateral flow path. The emitter has a first rail and a second rail operatively connected to the inner wall and a floor interconnecting distal ends of the first and second rails. The inner wall, the first and second rails, and the floor defining an emitter flow path. The emitter comprises a pressure responsive section and at least one feature defined by the floor, the first rail, and the second rail. The at least one feature is tuned by at least one tuning element to deflect at desired differential pressures local to the at least one feature. The tuning element is selected from the group consisting of rail to rail distance, rail height, rail width, rail radius curvature, rail corner, vertical rail gap, transverse rail gap, external rail, floor thickness, floor profile, tip height, tip clearance, feature density, feature contour, feature angle, and feature thickness. Wherein a discharge exponent for the emitter is 0 to 0.7, and wherein the at least one emitter feature deflects from an open position into a closed position when the desired differential pressure is local to the at least one feature.

BRIEF DESCRIPTION OF THE DRAWINGS

FIG. 4A illustrates another embodiment pressure responsive emitter.

FIG. 4B is a cross section of the pressure responsive emitter shown in FIG. 4A taken along the lines 4B-4B in FIG. 4A connected to a lateral.

FIG. 4C is a cross section of the pressure responsive emitter shown in FIG. 4A taken along the lines 4C-4C in FIG. 4A connected to a lateral.

FIG. 4D is an enlarged portion of the pressure responsive emitter shown in FIG. 4C in an open position.

FIG. 4E is an enlarged portion of the pressure responsive emitter shown in FIGS. 4C and 4D in a closed position.

FIG. 6A illustrates differential pressure of another embodiment pressure responsive emitter.

FIG. 6B illustrates feature deflection of other embodiments of pressure responsive emitters.

FIG. 7 illustrates another embodiment pressure responsive emitter.

FIG. 7A are cross sections of the pressure responsive emitter shown in FIG. 7 illustrating embodiments of rail to rail distances in the features taken along the lines A-A, B-B, and C-C in FIG. 7.

FIG. 7B are cross sections of the pressure responsive emitter shown in FIG. 7 illustrating embodiments of rail to rail distances and floor thicknesses in the features taken along the lines A-A, B-B, and C-C in FIG. 7.

FIG. 7C are cross sections of the pressure responsive emitter shown in FIG. 7 illustrating embodiments of rail to rail distances and rail widths in the features taken along the lines A-A, B-B, and C-C in FIG. 7.

FIG. 7D are cross sections of the pressure responsive emitter shown in FIG. 7 illustrating embodiments of rail to rail distances and internal rail heights in the features taken along the lines A-A, B-B, and C-C in FIG. 7.

FIG. 8A are cross sections of the pressure responsive emitter shown in FIG. 7, illustrating embodiments of rail to rail distances in the features taken along the lines A-A, B-B, and C-C in FIG. 7.

FIG. 8B are cross sections of the pressure responsive emitter shown in FIG. 7, illustrating embodiments of rail to rail distances and vertical rail gaps in the features taken along the lines A-A, B-B, and C-C in FIG. 7.

FIG. 8C are cross sections of the pressure responsive emitter shown in FIG. 7, illustrating embodiments of rail to rail distances and transverse rail gaps in the features taken along the lines A-A, B-B, and C-C in FIG. 7.

FIG. 8D are cross sections of the pressure responsive emitter shown in FIG. 7, illustrating embodiments of rail to rail distances and rail corners in the features taken along the lines A-A, B-B, and C-C in FIG. 7.

FIG. 9A are cross sections of the pressure responsive emitter shown in FIG. 7, illustrating embodiments of rail to rail distances in the features taken along the lines A-A, B-B, and C-C in FIG. 7.

FIG. 9B are cross sections of the pressure responsive emitter shown in FIG. 7, illustrating embodiments of rail to rail distances and tip clearances in the features taken along the lines A-A, B-B, and C-C in FIG. 7.

FIG. 9C are cross sections of the pressure responsive emitter shown in FIG. 7, illustrating embodiments of rail to rail distances and floor profiles in the features taken along the lines A-A, B-B, and C-C in FIG. 7.

FIG. 9D are cross sections of the pressure responsive emitter shown in FIG. 7, illustrating embodiments of rail to rail distances and feature contours in the features taken along the lines A-A, B-B, and C-C in FIG. 7.

FIG. 10A illustrates another embodiment pressure responsive emitter.

FIG. 10B illustrates another embodiment pressure responsive emitter with varying rail to rail distances and density of features.

FIG. 10C illustrates another embodiment pressure responsive emitter with varying rail to rail distances and angles of features.

FIG. 10D illustrates another embodiment pressure responsive emitter with varying rail to rail distances and thicknesses of features.

FIG. 11A illustrates another embodiment pressure responsive emitter with symmetrical upstream to downstream linear rail taper.

FIG. 11B illustrates another embodiment pressure responsive emitter with non-symmetrical upstream to downstream linear rail taper.

FIG. 14A illustrates another embodiment pressure responsive emitter with symmetrical multiple linear rail taper.

FIG. 14B illustrates another embodiment pressure responsive emitter with non-symmetrical multiple linear rail taper.

FIG. 15A illustrates another embodiment pressure responsive emitter with symmetrical multiple curvilinear rail taper.

FIG. 15B illustrates another embodiment pressure responsive emitter with symmetrical multiple curvilinear rail taper.

FIG. 16A illustrates another embodiment pressure responsive emitter with external rails.

FIG. 16B illustrates another embodiment pressure responsive emitter with external rails.

FIG. 16C illustrates another embodiment pressure responsive emitter with external rails.

FIG. 16D illustrates another embodiment pressure responsive emitter with external rails.

FIG. 17A illustrates another embodiment pressure responsive emitter with external rails.

FIG. 17B illustrates another embodiment pressure responsive emitter with external rails.

FIG. 17C illustrates another embodiment pressure responsive emitter with external rails.

FIG. 17D illustrates another embodiment pressure responsive emitter with external rails.

FIG. 18A illustrates another embodiment pressure responsive emitter with external rails.

FIG. 18B illustrates another embodiment pressure responsive emitter with external rails.

FIG. 18C illustrates another embodiment pressure responsive emitter with external rails.

FIG. 18D illustrates another embodiment pressure responsive emitter with external rails.

FIG. 19A illustrates another embodiment pressure responsive emitter with multiple external rails.

FIG. 19B illustrates another embodiment pressure responsive emitter with multiple external rails.

FIG. 19C illustrates another embodiment pressure responsive emitter with multiple external rails.

FIG. 19D illustrates another embodiment pressure responsive emitter with multiple external rails.

FIG. 23A illustrates another embodiment pressure responsive emitter with a stiffened outlet chamber and stiffening for lower durometer materials.

FIG. 23B illustrates another embodiment pressure responsive emitter with a stiffened outlet chamber and stiffening for lower durometer materials.

FIG. 23C illustrates another embodiment pressure responsive emitter with a stiffened outlet chamber and stiffening for lower durometer materials.

FIG. 23D illustrates another embodiment pressure responsive emitter with a stiffened outlet chamber and stiffening for lower durometer materials.

FIG. 24A illustrates another embodiment pressure responsive emitter with non-linear stiffening members.

FIG. 24B illustrates another embodiment pressure responsive emitter with non-linear stiffening members.

FIG. 24C illustrates another embodiment pressure responsive emitter with non-linear stiffening members.

FIG. 24D illustrates another embodiment pressure responsive emitter with non-linear stiffening members.

FIG. 24E illustrates another embodiment pressure responsive emitter with non-linear stiffening members.

FIG. 24F illustrates another embodiment pressure responsive emitter with non-linear stiffening members.

FIG. 24G illustrates another embodiment pressure responsive emitter with non-linear stiffening members.

FIG. 26A illustrates another embodiment pressure responsive emitter with examples of rail tuning via rail corners, transverse rail gaps, and floor profiles at cross section lines A-A, B-B, and C-C.

FIG. 26B illustrates another embodiment pressure responsive emitter with examples of rail tuning via rail corners, transverse rail gaps, and floor profiles at cross section lines A-A, B-B, and C-C.

FIG. 26C illustrates another embodiment pressure responsive emitter with examples of rail tuning via rail corners, transverse rail gaps, and floor profiles at cross section lines D-D, E-E, and F-F.

FIG. 26D illustrates cross sections of the emitters shown in FIGS. 26A, 26B, and 26C taken along the lines A-A, B-B, C-C, D-D, E-E, and F-F in FIGS. 26A, 26B, and 26C.

FIG. 27 illustrates examples of rail tuning to decrease flow in response to increasing pressure.

FIG. 28A illustrates a tuned rail example.

FIG. 28B illustrates a cross section taken along the lines 28B-28B in FIG. 28A.

FIG. 28C illustrates a non-tuned rail example.

FIG. 28D illustrates a cross section taken along the lines 28D-28D in FIG. 28C.

FIG. 28E is a graph comparing flow versus pressure for the rail tuned example illustrated in FIGS. 28A and 28B and the non-tuned example illustrated in FIGS. 28C and 28D.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Generally, embodiments of the invention relate to an elastomeric, continuous, in-line, drip irrigation emitter comprised of an inlet section, optionally followed by a pressure reducing section, followed by a pressure responsive section, and then followed by an outlet chamber. The pressure responsive section includes structural members or elements to allow tuning of the pressure responsive section with at least one of many restrictive features, adjust behavior of the outlet chamber, and/or enable use of reduced durometer elastomeric materials.

Figure 1:
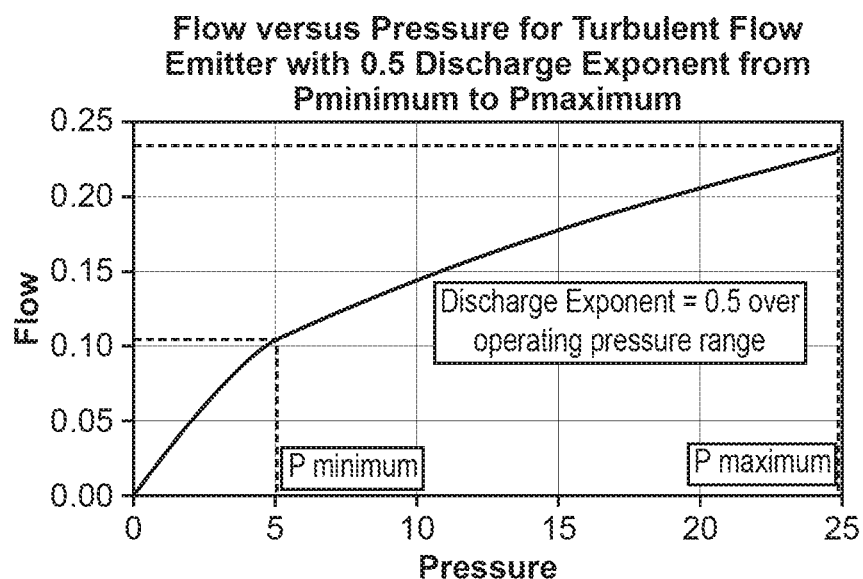
FIG. 1 is a graph illustrating flow versus pressure for a prior art turbulent flow fixed geometry emitter with a 0.5 discharge exponent from Pminimum to Pmaximum.

FIG. 1 shows the relationship between flow and pressure for a prior art turbulent flow fixed geometry emitter. Some turbulent flow emitters have discharge exponents of approximately 0.5, corresponding to fully turbulent behavior in which pressure drop relates to the square of flowrate. The governing equation in this example that the drip irrigation industry uses to relate flow, pressure, and discharge exponent is Flow=(Discharge Coefficient)×(Pressure)^Discharge Exponent. While the majority of fixed geometry emitters have discharge exponents of approximately 0.5, some fixed geometry emitters are designed to include transitional behavior over their flow ranges. These emitters have discharge exponents as low as 0.45 for emitters with higher gallons per hour (gph) discharge flow rates. Lower flowing emitters such as 0.0675 gph have discharge exponents of 0.52 to as high as 0.70. Whereas fixed geometry emitter designs can have discharge exponents down to as low as 0.45, to achieve discharge exponents lower than 0.45 requires the ability for the emitter to increase in resistance to flow in response to increasing pressure. Similarly, to achieve discharge exponents less than 0.52 for 0.0675 gph emitters require a design which increases resistance to flow in response to increasing flows.

Figure 2:
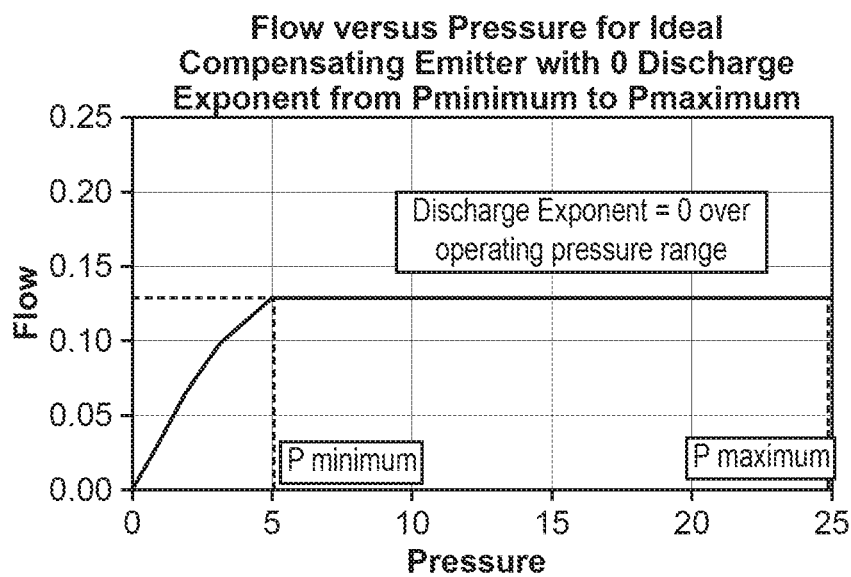
FIG. 2 is a graph illustrating flow versus pressure for a prior art ideal pressure compensating emitter with a 0 discharge exponent from Pminimum to Pmaximum.

FIG. 2 shows the relationship between flow and pressure for an ideal pressure compensating emitter, with discharge exponent of 0 or near 0 over the pressure range from minimum operating to maximum operating. The governing equation in this example that the drip irrigation industry uses to relate flow, pressure, and discharge exponent is Flow=(Discharge Coefficient)×(Pressure)^Discharge Exponent. To achieve a discharge exponent of 0 or near 0, the emitter designs include sufficient quantity of features and the combined action of those features accomplish an increase in resistance to flow in direct proportion to increase in pressure. An emitter with discharge exponent of 0 or near 0 provides the greatest uniformity of water delivered to the plants over the length of the irrigation lateral and in response to changes in pressure related to elevation changes. There are circumstances, however, in which a user desires to increase flow, while also having better uniformity than can be provided by a turbulent flow emitter. An example would be during times of peak temperature and wind wherein the crop requires greater amount of water be applied. An emitter with discharge exponent greater than 0 will allow higher flow rates in response to increasing pressure, while an emitter with a discharge exponent less than 0.45 will provide greater uniformity of water applied to a crop than a fixed resistance emitter can provide.

Embodiments of the invention enable emitter designs to be established to provide any discharge exponent desired, for example from 0 through 0.5 (or more). An example use for a discharge exponent greater than 0.5 would be to maintain a discharge exponent of 0.7 for a 0.0675 gph emitter, adding a greater number of features in accordance with the present invention, thereby enabling larger cross sectional areas, whereby allowing less stringent water filtration requirements. Although FIG. 2 illustrates a prior art ideal compensating emitter with the same flow at all pressures within the operating pressure range, in reality, the flow varies as a result of an emitter design's ability to enable additional resistance features to participate in response to increasing pressure. For emitters with a large number of resistance features, a technical challenge is to devise a method by which the resistance features can be tuned to respond in manners to achieve the desired relationships between flow and pressure.

Embodiments of the emitters are illustrated schematically in the drawings. A person having ordinary skill in the art will appreciate that single lines indicate various emitter components (e.g., inlet members, rails, structural members or elements within the pressure responsive sections, etc.) having suitable thicknesses. For example, in FIG. 3A, single lines indicate the inlet members, the rails, and structural members between the rails, and it is recognized that these components have suitable thicknesses. Suitable thicknesses could range from 0.005 to 0.030 inch.

Figure 3A:
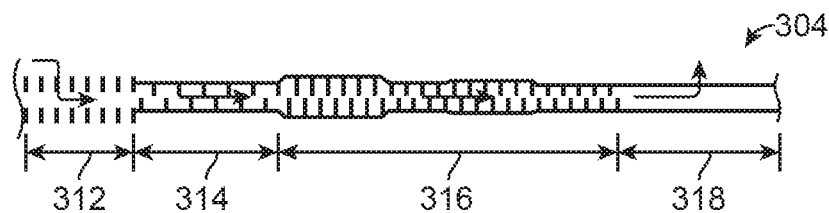
FIG. 3A is an embodiment pressure compensating emitter constructed in accordance with the principles of the present invention.
Figure 3B:
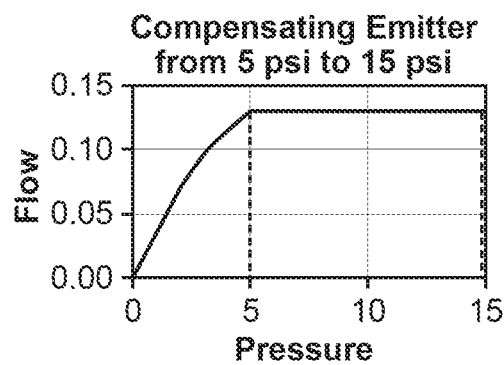
FIG. 3B is a graph illustrating flow versus pressure for the pressure compensating emitter shown in FIG. 3A from 5 psi to 15 psi.
Figure 3C:
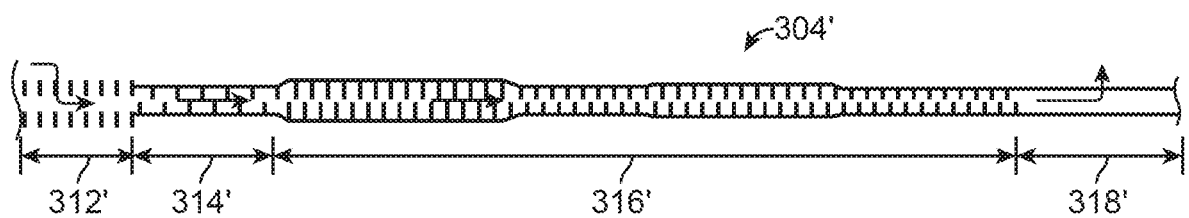
FIG. 3C is another embodiment pressure compensating emitter constructed in accordance with the principles of the present invention.
Figure 3D:
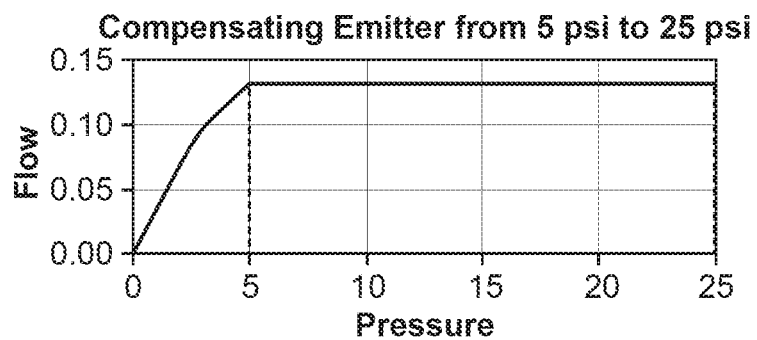
FIG. 3D is a graph illustrating flow versus pressure for the pressure compensating emitter shown in FIG. 3C from 5 psi to 25 psi.

FIG. 3A illustrates an example of an emitter 304 with an operating pressure range from 5 to 15 psi that triples its resistance to flow in order to dissipate 15 psi at the same flow as at 5 psi, as illustrated in FIG. 3B. The emitter 304 includes an inlet section 312, a pressure reducing section 314, a pressure responsive section 316, and an outlet section 318. FIG. 3C illustrates an example emitter 304' where the operating pressure range is increased to be from 5 to 25 psi, as illustrated in FIG. 3D. The emitter 304' includes an inlet section 312', a pressure reducing section 314', a pressure responsive section 316', and an outlet section 318'. In order to maintain the same flow at 25 psi as at 5 psi, for example, a fivefold increase in resistance to flow is applied in response to increasing pressure. For this reason, the emitter depicted in FIG. 3C has more features than depicted in FIG. 3A. In modern commercial drip irrigation installations, operating pressures as low as 4 psi and as high as 30 psi are not uncommon for medium walled products. A broad pressure range from 4 to 30 psi, for example, may require a 7.5:1 increase in resistance to flow in order to have same flow at 30 psi as at 4 psi. In comparison, thin walled products have smaller pressure ranges as low as 4 to 8 psi requiring only a 2:1 increase in resistance. For reference, thick walled products generally operate from 6 to 45 psi (also 7.5:1 increase in resistance to flow may be needed if the emitter is to maintain same flow over the pressure range).

FIGS. 4A-4E illustrate embodiments of emitters and provide initial definitions of emitter tuning elements that may be used with embodiments. As shown in FIG. 4A, the emitter 404 includes an inlet section 412, a pressure reducing section 414, a pressure responsive section 416, and an outlet section 418. FIG. 4B illustrates a cross section of the emitter 404 taken along the lines 4B-4B in FIG. 4A connected to a tube 400, and FIG. 4C illustrates a cross section of the emitter 404 taken along the lines 4C-4C in FIG. 4A connected to the tube 400. FIGS. 4D and 4E illustrate an enlarged portion of the emitter 404 shown in FIG. 4C in a fully open position 408 and in a fully closed position 409, respectively. The tube 400 includes a wall 401 with an inner wall 402 to which the emitter 404 is connected. The emitter 404 includes rails 405a and 405b connected to the inner wall, and a floor 406 interconnects the distal ends of the rails 405a and 405b. A feature 407 interconnects a portion of the floor 406 to a portion of one of the rails 405a and 405b, shown connected to a portion of the rail 405a in this example. The emitter floor 406 along with the feature 407 begin to move or deflect from the fully open position 408 through a series of intermediate positions toward the direction of fully closed position 409 when an initial desired differential pressure between the inside of the tube 400 and the inside of the emitter 404 is reached proximate the feature 407 and reaches the fully closed position 409 when a final desired differential pressure between the inside of the tube 400 and the inside of the emitter 404 is reached proximate the feature 407.

Figure 5A:
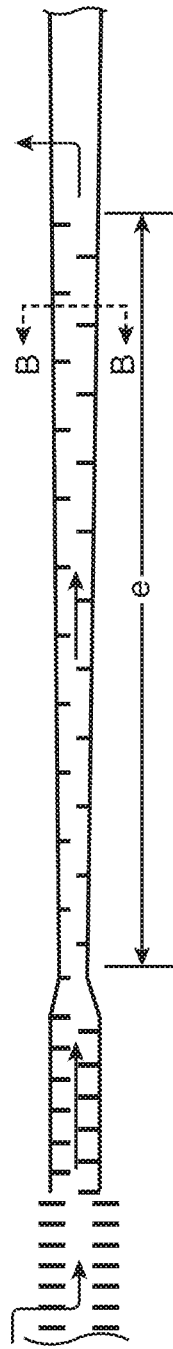
FIG. 5A illustrates another embodiment pressure responsive emitter.
Figure 5B:
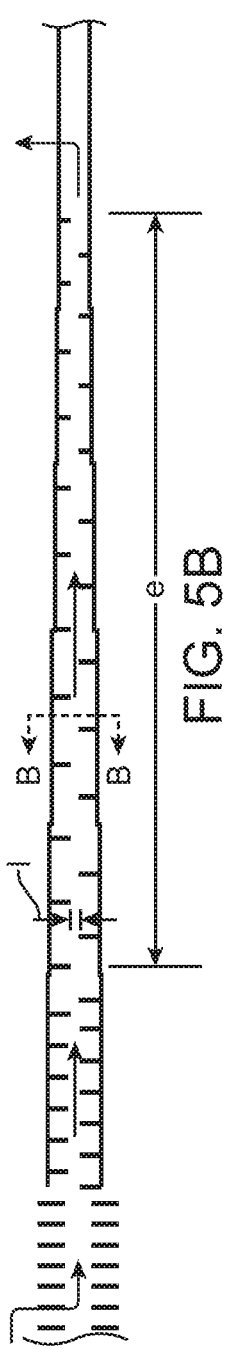
FIG. 5B illustrates another embodiment pressure responsive emitter.
Figure 5C:
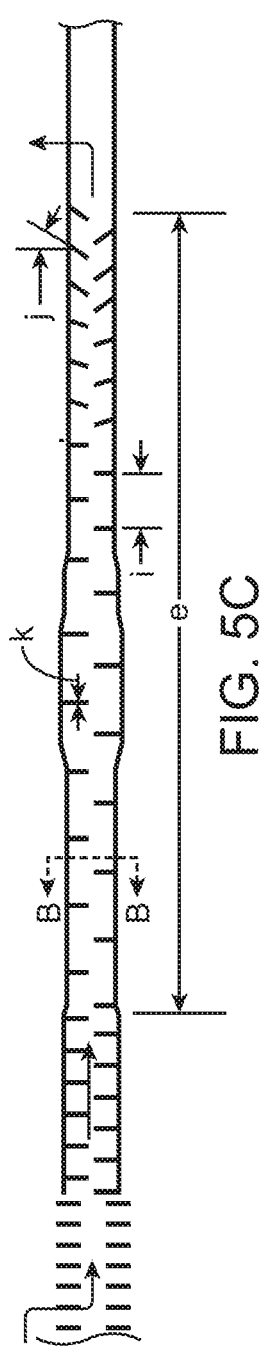
FIG. 5C illustrates another embodiment pressure responsive emitter.
Figure 5E:
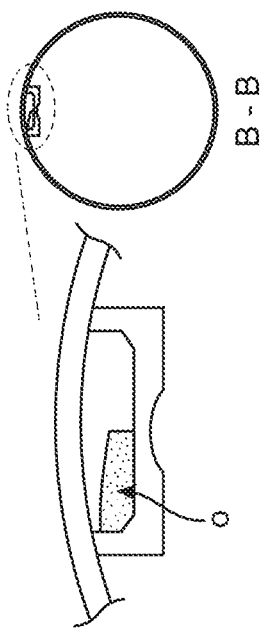
FIG. 5E is a cross section of a pressure responsive section, which could be used for example in sections B-B of FIGS. 5A, 5B, and 5C.
Figure 5D:
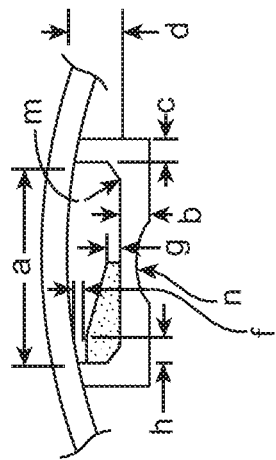
FIG. 5D is a cross section of a pressure responsive section, which could be used for example in sections B-B of FIGS. 5A, 5B, and 5C.

FIGS. 5A-5E illustrate embodiment emitters and provide definitions of emitter tuning elements within the pressure responsive sections. Because these definitions may be applicable to many different embodiments of emitters, for example with different dimensions or configurations, like reference letters are being used throughout the views. Although dimensions and configurations are shown in these embodiments, these are variable as desired to achieve desired results. FIGS. 5A, 5B, and 5C illustrate different emitters having pressure responsive sections. FIGS. 5D and 5E illustrate enlarged portions of the emitters taken along the lines B-B in FIGS. 5A, 5B, and 5C. FIG. 5E shows the emitter connected to a lateral. The reference letters and corresponding elements, which are only examples and are variable as desired to achieve desired results, are as follows in Table 1:

TABLE 1

Reference Letters and Corresponding Elements

| Letter | Element |
|---|---|
| a | internal rail to rail distance |
| b | floor thickness |
| c | rail width |
| d | internal rail height |
| e | pressure responsive section length |
| f | vertical rail gap |
| g | tip height |
| h | transverse rail gap |
| i | feature density |
| j | feature angle |
| k | feature thickness |
| l | tip clearance |
| m | rail corner (chamfer or radius) |
| n | floor profile |
| o | feature contour |

As can be seen in FIG. 4B, in contrast with many common emitter designs which include a body and a diaphragm to engage features on the body, this embodiment does not have a body. Rather, this embodiment has the elastomeric strip directly bonded to the inner wall of the tube or lateral. This provides a benefit of low profile emitter, being less restrictive to flow within the tube itself. With this construction, the features are molded directly onto the elastomeric strip. As can also be seen in FIG. 4B, flow restrictive features within the pressure reducing section may be full height, touching both the inner wall of the tube and molded integral to the floor of the elastomeric strip itself. As can be seen in FIGS. 4C, 4D, and 4E, flow restrictive features within the pressure responsive section may be less than full height. They are molded integral to the floor of the elastomeric strip itself, but do not touch the inner wall of the tube unless deflected upward as shown in FIG. 4E. FIG. 6A shows the pressures which act upon a specific feature within the pressure responsive section. The differential pressure is line pressure PL minus internal pressure PI. Line pressure PL is the line pressure present inside the lateral and acts upon all external surfaces of the emitter at the location of the specific feature. Internal pressure PI is the internal pressure inside the emitter local to the feature. Internal pressure PI acts upon all internal surfaces of the emitter at the location of the specific feature. As illustrated in FIG. 6B, the cross sectional stiffness of the emitter construction local to the feature responds to the differential pressure to define the magnitude of feature deflection. The cross sectional stiffness of a given feature is defined by various tuning elements labeled as (a) through (o), within FIGS. 5A-5E and by external rail tuning elements (described later). The features within the pressure responsive region do not participate fully in creating pressure drop until such conditions where the feature deflects upward against the inner surface of the tube. It is the desired combination of tuning elements shown in FIGS. 5A-5E which provide the ability to tune each specific feature within the pressure responsive section to be deflected at specific differential pressures local to the feature. By tuning the overall combination of features along the length of the pressure responsive section, the resistance to flow for the emitter can be tuned to increase in response to pressure increases to create flow versus pressure responses with discharge exponents ranging from, for example, 0 to 0.5 (or more) for a range of flows and operating pressure ranges. For initial understanding of one tuning element, FIG. 4A and FIGS. 5A, 5B, 5C show four emitter configurations wherein the tuning element of rail to rail distance has been tuned along the length of the pressure responsive section (other tuning elements are employed as well). Additional overall configurations, including use of external additional rails for tuning will be described later. As illustrated in FIG. 4A, in order to achieve a large operating pressure range with a low flowing emitter, there may be a need to include many resistance features. Although examples of combinations of tuning elements are shown and described, it is recognized that one having ordinary skill in the art could use varieties of combinations to achieve desired tuning.

Through the use of the tuning elements to define individual feature cross sectional stiffness, it becomes possible to distribute the resistance features over a long length dimension of the emitter. This provides for the desired low profile emitter with low restriction of the flow within the tube, while allowing larger dimensions within the emitter because many features are used for pressure dissipation.

Embodiments include the use of an array of tuning elements to work in conjunction so that specific features can be tuned, whereby providing the ability to incorporate a great number of resistance features in series which together can be tuned to create desired relationships between flow and pressure. Although articulated herein for a elastomeric strip, the tuning elements could also be employed in a variety of designs such as, but not limited to, discrete elastomeric emitters bonded to inner walls, elastomeric members with integral features as part of discrete emitter assembly combining the elastomeric member within an injection molded body, elastomeric member without integral features but installed as part of an injection molded body with varied width opposing features as part of the molded itself, or as part of a two part injection molded design. Further, although the lateral walls herein are depicted as continuous around the perimeter, it is understood that this invention could be applied to emitters wherein walls are discontinuous around the perimeter which include one or more seams to form a complete perimeter.

FIGS. 7A through 10D are provided to illustrate the functional usage of the tuning elements defined in FIGS. 5A-5E and Table 1. Table 2 includes additional application notes to provide further understanding.

TABLE 2

Relationships between Geometric Tuning Elements Shown in FIGS. 5A-5E

| Ratio | Applicability Comments |
|---|---|
| (a)/(b) | When tuning combination internal rail distance and floor thickness pairing: Higher ratios (a)/(b) are useful for lower maximum pressure ratings such as 8 psi. Lower ratios are useful for higher maximum pressure ratings such as 30 psi |
| (a)/(c) | When tuning combination internal rail distance and rail width pairing: Higher ratios (a)/(c) are useful for lower maximum pressure ratings such as 8 psi. Lower ratios are useful for higher maximum pressure ratings such as 30 psi |
| (a)/(d) | When tuning combination internal rail distance and internal rail height pairing: Higher ratios (a)/(d) are useful for lower flows such as 0.0675 gph, most especially with overall emitter length limitations (i.e. limited with regard to number of features which can be used). Lower ratios are useful for higher flows such as 0.54 gph, in conjunction with higher maximum pressure ratings such as 30 psi. |
| (e)/(a) | When tuning combination pressure responsive section length and internal rail distance pairing: Higher ratios (e)/(a) are useful for lower flows such as 0.0675 gph, in combination with high maximum pressures rating such as 30 psi (i.e. combination of less effective pressure drop generation at low flow and larger pressure range requires high feature count). Lower ratios are useful for higher flows such as 0.54 gph, in combination with low maximum pressure ratings such as 8 psi (i.e. combination of greatest pressure drop generation at high flow, and lowest overall pressure range to dissipate, requires low feature count). |
| (a)/(f) | When tuning combination internal rail distance and vertical rail gap pairing: Higher ratios (a)/(f) are useful for lower flows such as 0.0675 gph where maximum resistance per feature is useful. Lower ratios are useful for higher flows such as 0.54 gph, where larger area above the feature is useful. |
| (a)/(g) | When tuning combination internal rail distance and tip height pairing: Higher ratios (a)/(g) are useful for lower flows such as 0.0675 gph where maximum resistance per feature is useful. Lower ratios are useful for higher flows such as 0.54 gph, where larger cross sectional areas can be accommodated. |
| (a)/(h) | When tuning combination internal rail distance and transverse rail gap pairing: Higher ratios (a)/(h) are useful for pressure responsive features located in regions with lower differential pressure between line pressure and internal pressure. Lower ratios are useful for pressure responsive features located in regions with higher differential pressure between line pressure and internal pressure. |
| (a)/(i) | When tuning combination internal rail distance and feature density pairing: Lower ratios (a)/(i) are useful for pressure responsive features located in regions with lower differential pressure between line pressure and internal pressure. Higher ratios are useful for pressure responsive features located in regions with higher differential pressure between line pressure and internal pressure. |
| (a)/(j) | When tuning combination internal rail distance and feature angle pairing: Lower ratios (i.e. angle is larger) (a)/(j) are useful for pressure responsive features located in regions with lower differential pressure between line pressure and internal pressure. Higher ratios (i.e. angle is closer to zero) are useful for pressure responsive features located in regions with higher differential pressure between line pressure and internal pressure. |
| (a)/(k) | When tuning combination internal rail distance and feature thickness pairing: Lower ratios (a)/(k) are useful for pressure responsive features located in regions with higher differential pressure between line pressure and internal pressure. Higher ratios are useful for pressure responsive features located in regions with lower differential pressure between line pressure and internal pressure. |
| (a)/(l) | When tuning combination internal rail distance and tip clearance pairing: Use of overlap tip clearance is useful for pressure responsive features located in regions with higher differential pressure between line pressure and internal pressure. Use of underlap tip clearance is useful for pressure responsive features located in regions with lower differential pressure between line pressure and internal pressure. |
| (a)/(m) | When tuning combination internal rail distance and rail corner pairing: Presence of a corner (either chamfer or radius) is useful for pressure responsive features located in regions with higher differential pressure between line pressure and internal pressure. Use of smaller dimension corner, or no corner is useful for pressure responsive features located in regions with lower differential pressure between line pressure and internal pressure. Corner is also useful to enable use of lower durometer materials. |
| (a)/(n) | When tuning combination internal rail distance and floor profile pairing: Thickening of profile is useful for pressure responsive features located in regions with higher differential pressure between line pressure and internal pressure. Thinning of profile is useful for pressure responsive features located in regions with lower differential pressure between line pressure and internal pressure. |
| (a)/(o) | When tuning combination internal rail distance and feature contour pairing: Use of concave feature contour for the top of the feature can be useful wherein smaller contour radius is located in feature location with higher differential pressure, and larger contour radius is used in feature location with lower |

TABLE 2-continued

Relationships between Geometric Tuning Elements Shown in FIGS. 5A-5E

Ratio  Applicability Comments differential pressure. Use of contour radius matching tube inner radius can assist with sealing at locations of lowest differential pressure, however it is not necessary have exact same radius for a benefit in sealing to be accomplished.

FIG. 7 is an embodiment emitter with section views A-A, B-B, and C-C. FIG. 7A illustrates the use of tuning element rail to rail distance as a means of defining cross sectional stiffness. Because dimension (3) is less than dimension (2) and dimension (1), the cross sectional stiffness is higher for features at section C-C. This means that the differential pressure to deflect the features at section C-C is higher than the differential pressure to deflect the features at sections B-B and A-A. Likewise, the differential pressure to deflect the features at section B-B is greater than at section A-A. Through selecting rail to rail distances for each specific feature along the length of the pressure responsive section, it is possible to tune the overall emitter response.

The same rail to rail dimension explanation above for FIG. 7A is applicable for FIGS. 8A, 9A, and 10A. For the remaining FIGS. 7B-7D, 8B-8D, 9B-9D, and 10B-10D, tuning elements are shown one at a time in conjunction with the rail to rail distance element in order to assist with understanding of their functions. In practice, the elements may be used in any combination, alone, or in conjunction with each other to tune the emitter response. The elements may also be used in any combination in conjunction with external rails for tuning. The tuning elements can also be used in non-symmetrical fashion at a given position, or along multiple positions within the pressure responsive section.

FIG. 7B illustrates the influence of floor thickness upon cross sectional stiffness. Whereas FIG. 7A held floor thickness constant, in FIG. 7B the use of thinner floor at section A-A and thicker floor at section C-C further enhances the difference in cross sectional stiffness between FIG. 7B sections A-A, B-B, and C-C. Said a different way, because the floor thickness is an integral part of cross sectional stiffness, as is rail to rail distance, the difference between differential pressure to deflect FIG. 7B A-A compared to the differential pressure to deflect FIG. 7B C-C is a greater difference than is the case for A-A versus C-C in FIG. 7A. As a result, using both tuning elements (rail to rail distance and floor thickness) together increases the design flexibility to tune an emitter to have individual features move at specific portions of the flow versus pressure curve.

FIG. 7C illustrates the influence of rail width upon cross sectional stiffness. Whereas FIG. 7A held rail width constant, in FIG. 7C the use of narrower rail width at section A-A and wider rail width at section C-C further enhances the difference in cross sectional stiffness between FIG. 7C sections A-A, B-B, and C-C. Said a different way, because the rail width is an integral part of cross sectional stiffness, as is rail to rail distance, the difference between differential pressure to deflect FIG. 7C A-A compared to the differential pressure to deflect FIG. 7C C-C is a greater difference than is the case for A-A versus C-C in FIG. 7A. As a result, using both tuning elements (rail to rail distance and rail width) together increases the design flexibility to tune an emitter to have individual features move at specific portions of the flow versus pressure curve.

FIG. 7D illustrates the influence of rail height upon cross sectional stiffness. Whereas FIG. 7A held rail height constant, in FIG. 7D the use of taller rail height at section A-A and shorter rail height at section C-C further enhances the difference in cross sectional stiffness between FIG. 7D sections A-A, B-B, and C-C. Said a different way, because the rail height is an integral part of cross sectional stiffness, as is rail to rail distance, the difference between differential pressure to deflect FIG. 7D A-A compared to the differential pressure to deflect FIG. 7D C-C is a greater difference than is the case for A-A versus C-C in FIG. 7A. As a result, using both tuning elements (rail to rail distance and rail height) together increases the design flexibility to tune an emitter to have individual features move at specific portions of the flow versus pressure curve.

FIG. 8B illustrates the influence of vertical rail gap upon cross sectional stiffness. Whereas FIG. 8A held vertical rail gap constant, in FIG. 8B the use of larger vertical rail gap (result is shorter feature and decreased stiffness) at section A-A and smaller vertical rail gap (result is taller feature and increased stiffness) at section C-C further enhances the difference in cross sectional stiffness between FIG. 8B sections A-A, B-B, and C-C. Said a different way, because the vertical rail gap (and associated feature height) is an integral part of cross sectional stiffness, as is rail to rail distance, the difference between differential pressure to deflect FIG. 8B A-A compared to the differential pressure to deflect FIG. 8B C-C is a greater difference than is the case for A-A versus C-C in FIG. 8A. As a result, using both tuning elements (rail to rail distance and vertical rail gap) together increases the design flexibility to tune an emitter to have individual features move at specific portions of the flow versus pressure curve. An alternate use of vertical rail gap is to hold feature height constant and change only vertical rail gap, in which case feature stiffness remains similar, and the change in deflection distance to contact inner wall becomes greater influence upon tuning.

FIG. 8C illustrates the influence of transverse rail gap upon cross sectional stiffness. Whereas FIG. 8A held transverse rail gap constant, in FIG. 8C the use of smaller transverse rail gap at section A-A and larger transverse rail gap at section C-C further enhances the difference in cross sectional stiffness between FIG. 8C sections A-A, B-B, and C-C. Said a different way, because the transverse rail gap is an integral part of cross sectional stiffness, as is rail to rail distance, the difference between differential pressure to deflect FIG. 8C A-A compared to the differential pressure to deflect FIG. 8C C-C is a greater difference than is the case for A-A versus C-C in FIG. 8A. As a result, using both tuning elements (rail to rail distance and transverse rail gap) together increases the design flexibility to tune an emitter to have individual features move at specific portions of the flow versus pressure curve.

FIG. 8D illustrates the influence of rail corner upon cross sectional stiffness. An internal rail corner m is illustrated in FIG. 5D, and FIG. 8D adds an external rail corner m'.

Whereas FIG. 8A held rail corner constant, in FIG. 8D the use of smaller rail corner at section A-A and larger rail corner at section C-C further enhances the difference in cross sectional stiffness between FIG. 8D sections A-A, B-B, and C-C. Said a different way, because the rail corner is an integral part of cross sectional stiffness, as is rail to rail distance, the difference between differential pressure to deflect FIG. 8D A-A compared to the differential pressure to deflect FIG. 8D C-C is a greater difference than is the case for A-A versus C-C in FIG. 8A. As a result, using both tuning elements (rail to rail distance and rail corner) together increases the design flexibility to tune an emitter to have individual features move at specific portions of the flow versus pressure curve. For illustration purposes, to highlight that rail corners can be either internal and/or external, FIG. 8D C-C includes both internal and external rail corners, further increasing the cross sectional stiffness. Although shown in FIG. 8D C-C with both internal and external rail corners, either can be used alone, or in conjunction with each other. It is also recognized that rail corner(s) could be used on one or both sides of feature(s) along the pressure responsive section.

FIG. 9B illustrates the influence of tip clearance upon cross sectional stiffness. Whereas FIG. 9A held tip clearance constant, in FIG. 9B the use of larger tip clearance (underlap) at section A-A and smaller tip clearance (overlap) at section C-C further enhances the difference in cross sectional stiffness between FIG. 9B sections A-A, B-B, and C-C. Said a different way, because the tip clearance is an integral part of cross sectional stiffness, as is rail to rail distance, the difference between differential pressure to deflect FIG. 9B A-A compared to the differential pressure to deflect FIG. 9B C-C is a greater difference than is the case for A-A versus C-C in FIG. 9A. As a result, using both tuning elements (rail to rail distance and tip clearance) together increases the design flexibility to tune an emitter to have individual features move at specific portions of the flow versus pressure curve.

FIG. 9C illustrates the influence of floor profile upon cross sectional stiffness. Whereas FIG. 9A held floor profile constant, in FIG. 9C the use of dual sided concave floor profile at section A-A and convex floor profile at section C-C further enhances the difference in cross sectional stiffness between FIG. 9C sections A-A, B-B, and C-C. Said a different way, because the floor profile is an integral part of cross sectional stiffness, as is rail to rail distance, the difference between differential pressure to deflect FIG. 9C A-A compared to the differential pressure to deflect FIG. 9C C-C is a greater difference than is the case for A-A versus C-C in FIG. 9A. As a result, using both tuning elements (rail to rail distance and floor profile) together increases the design flexibility to tune an emitter to have individual features move at specific portions of the flow versus pressure curve.

FIG. 9D illustrates the influence of feature contour upon cross sectional stiffness. Whereas FIG. 9A held feature contour constant, in FIG. 9D the use of larger radius of curvature feature contour at section A-A and smaller radius of curvature feature contour at section C-C further enhances the difference in cross sectional stiffness between FIG. 9D sections A-A, B-B, and C-C. Said a different way, because the feature contour is an integral part of cross sectional stiffness, as is rail to rail distance, the difference between differential pressure to deflect FIG. 9D A-A compared to the differential pressure to deflect FIG. 9D C-C is a greater difference than is the case for A-A versus C-C in FIG. 9A. As a result, using both tuning elements (rail to rail distance and feature contour) together increases the design flexibility to tune an emitter to have individual features move at specific portions of the flow versus pressure curve.

FIG. 10A has the same section views A-A, B-B, and C-C as shown in FIGS. 7A, 8A and 9A and illustrates that rail to rail distances may vary. Distance 1 is greater than distance 2, and distance 2 is greater than distance 3. FIG. 10B illustrates that rail to rail distances may vary and the influence of feature density upon cross sectional stiffness. Distance 1 is greater than distance 2, and distance 2 is greater than distance 3. Whereas FIG. 10A held feature density constant, in FIG. 10B, the use of larger dimension feature density proximate cross section A-A and smaller dimension feature density proximate cross section C-C further enhances the difference in cross sectional stiffness between cross sections A-A, B-B, and C-C. Dimension 31 is larger than dimension 32, and dimension 32 is larger than dimension 33. Said a different way, because the feature density is an integral part of cross sectional stiffness, as is rail to rail distance, the difference between differential pressure to deflect proximate cross section A-A compared to the differential pressure to deflect proximate cross section C-C in FIG. 10B is a greater difference than is the case for cross section A-A versus cross section C-C in FIG. 10A. As a result, using both tuning elements (rail to rail distance and feature density) together increases the design flexibility to tune an emitter to have individual features move at specific portions of the flow versus pressure curve.

FIG. 10C illustrates that rail to rail distances may vary and the influence of feature angle upon cross sectional stiffness. Whereas FIG. 10A held feature angle constant, in FIG. 10C the use of larger feature angle 36 proximate cross section A-A and smaller feature angle 34 proximate cross section C-C further enhances the difference in cross sectional stiffness between FIG. 10C sections A-A, B-B, and C-C. In this example, distance 1 is greater than distance 2, distance 2 is greater than distance 3, angle 36 is greater than angle 35, and angle 35 is greater than angle 34. Said a different way, because the feature angle is an integral part of cross sectional stiffness, as is rail to rail distance, the difference between differential pressure to deflect proximate cross section A-A compared to the differential pressure to deflect proximate cross section C-C in FIG. 10C is a greater difference than is the case for cross section A-A versus cross section C-C in FIG. 10A. As a result, using both tuning elements (rail to rail distance and feature angle) together increases the design flexibility to tune an emitter to have individual features move at specific portions of the flow versus pressure curve.

FIG. 10D illustrates that rail to rail distance may vary and the influence of feature thickness upon cross sectional stiffness. Whereas FIG. 10A held feature thickness constant, in FIG. 10D the use of smaller feature thickness proximate cross section A-A and greater feature thickness proximate cross section C-C further enhances the difference in cross sectional stiffness between cross sections A-A, B-B, and C-C. In this example, distance 1 is greater than distance 2, distance 2 is greater than distance 3, thickness 39 is greater than thickness 38, and thickness 38 is greater than thickness 37. Said a different way, because the feature thickness is an integral part of cross sectional stiffness, as is rail to rail distance, the difference between differential pressure to deflect proximate cross section A-A compared to the differential pressure to deflect proximate cross section C-C in FIG. 10D is a greater difference than is the case for cross section A-A versus cross section C-C in FIG. 10A. As a result, using both tuning elements (rail to rail distance and feature thickness) together increases the design flexibility to tune an emitter to have individual features move at specific portions of the flow versus pressure curve.

FIGS. 11A and 11B show embodiments in which the internal rail to rail distance is changed linearly by tapering at least one of the rails (rails 1105a and 1105b in FIG. 11A; rails 1105c and 1105d in FIG. 11B) in the upstream to downstream direction, with dimension A being greater than dimension B in each embodiment. Included are both symmetrical (FIG. 11A) and non-symmetrical (FIG. 11B) configurations. In FIG. 11A, both rails 1105a and 1105b are tapered, and in FIG. 11B, rail 1105c is not tapered while rail 1105d is tapered. By adjusting the angle of the tapering internal rail to rail distance, the features within the pressure responsive sections (1116a in FIG. 11A and 1116b in FIG. 11B) can be tuned to respond in conjunction with each other in order to dissipate the pressure applied. Configurations similar to those shown in FIGS. 11A-11B could also be useful if desired to achieve closure of the individual resistance features in an upstream to downstream manner in response to increasing pressures. However, by modifying the angle of the tapering and/or using other tuning elements, the emitter can also be made to not follow upstream to downstream closure of features in response to increasing pressure.

Figure 12A:
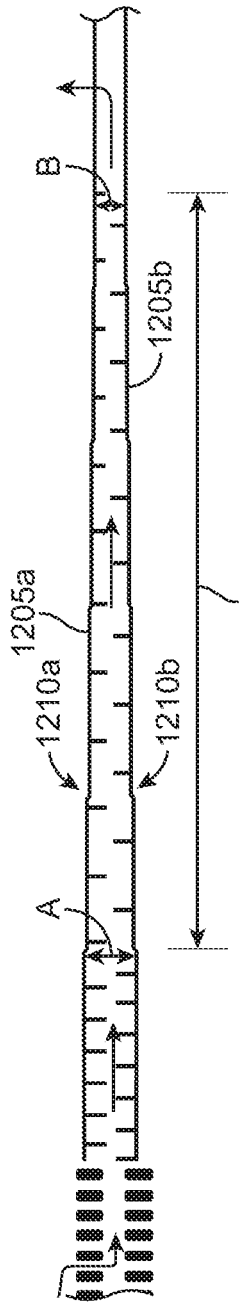
FIG. 12A illustrates another embodiment pressure responsive emitter with stepped, symmetrical upstream to downstream linear rail taper.
Figure 12B:
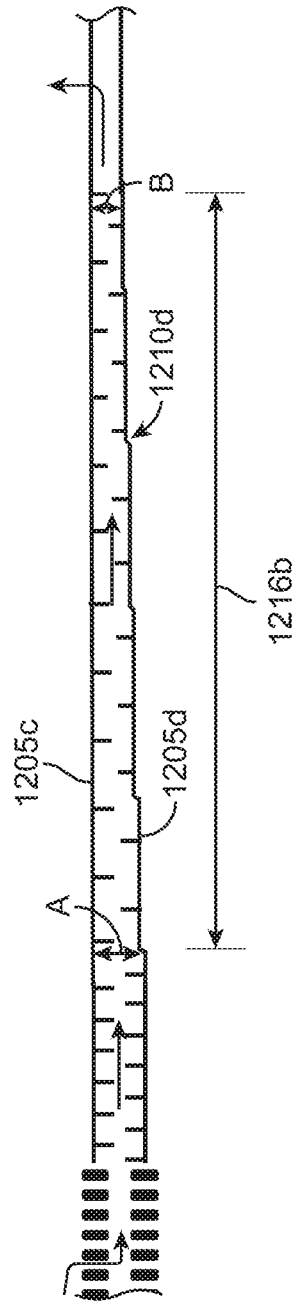
FIG. 12B illustrates another embodiment pressure responsive emitter with partially stepped, non-symmetrical upstream to downstream linear rail taper.
Figure 12C:
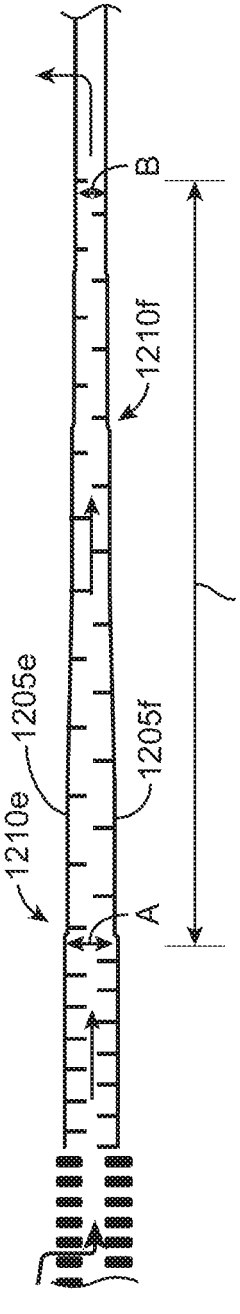
FIG. 12C illustrates another embodiment pressure responsive emitter with stepped and tapered upstream to downstream linear rail taper.

FIGS. 12A-12C show embodiments in which tapering rail to rail dimensions are implemented in stepwise manners, instead of the continuous tapers shown in FIGS. 11A-11B, with dimension A being greater than dimension B in each embodiment. FIG. 12A is generally symmetrical with both rails 1205a and 1205b including a plurality of steps 1210a and 1210b to form a stepped pressure responsive section 1216a. FIG. 12B is generally non-symmetrical with rail 1205c not including any steps while rail 1205d includes a plurality of steps 1210d within the pressure responsive section 1216b. FIG. 12C illustrates a combination of stepped and tapered pressure responsive section 1216c. The rails 1205e and 1205f are tapered and include a plurality of steps 1210e and 1210f. Using stepwise tapering has a benefit with regard to simplifying the programming and machining of mold tooling used to create the emitters. Use of stepped changes, or combination stepped and tapered, in rail to rail dimension instead of fully continuous may also be used with embodiments shown in other embodiments herein which are linear or curvilinear in design.

Figure 13A:
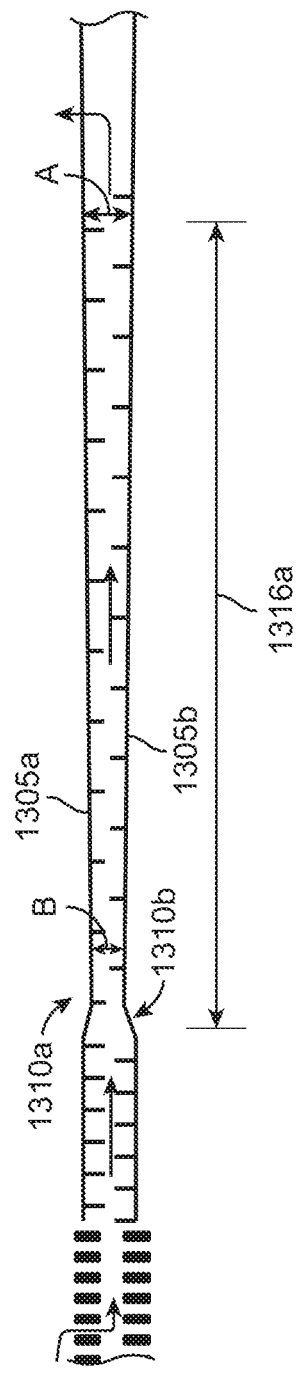
FIG. 13A illustrates another embodiment pressure responsive emitter with symmetrical upstream to downstream linear rail taper.
Figure 13B:
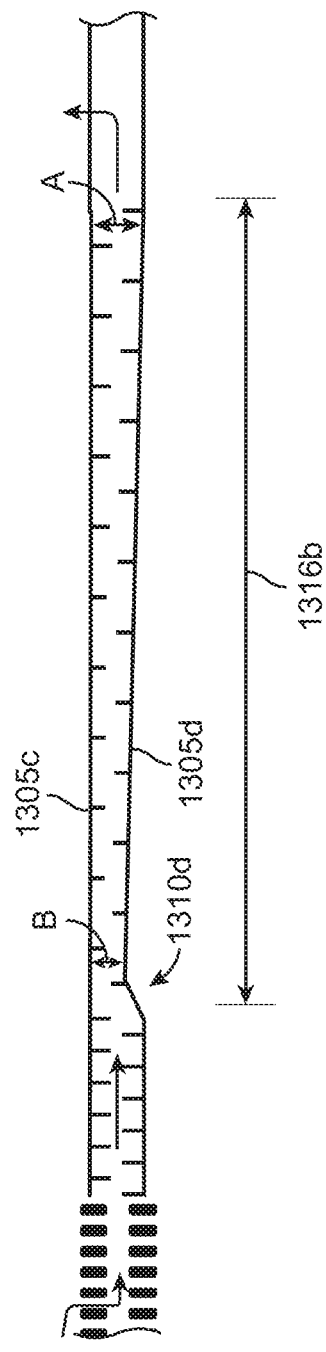
FIG. 13B illustrates another embodiment pressure responsive emitter with non-symmetrical upstream to downstream linear rail taper.

FIGS. 13A-13B show embodiments in which the internal rail to rail distance is changed linearly tapering in the downstream to upstream direction, with dimension A being greater than dimension B in each embodiment. Included are both generally symmetrical (FIG. 13A) and non-symmetrical (FIG. 13B) configurations. In FIG. 13A, the rails 1305a and 1305b are both tapered and, in addition, rail 1305a includes a tapered step portion 1310a and rail 1305b includes a tapered step portion 1310b within the pressure responsive section 1316a. Although the tapered step portions 1310a and 1310b are not symmetrical, the remaining portions of the rails 1305a and 1305b are generally symmetrical. In FIG. 13B, the rail 1305c is not tapered and rail 1305d is tapered and includes a tapered step portion 1310d within the pressure responsive section 1316b. By adjusting the angle of the tapering internal rail to rail distance, the features within the pressure responsive sections can be tuned to respond in conjunction with each other in order to dissipate the pressure applied. Configurations similar to those shown in FIGS. 13A-13B can be useful if it is desired to achieve closure of the individual resistance features in a downstream to upstream manner in response to increasing pressures. However, by modifying the angle of the tapering and/or using other tuning elements, the emitter can also be made to not follow a downstream to upstream closure of features in response to increasing pressure. Through inclusion of lowest cross sectional stiffness (from a rail to rail distance perspective) region nearest to outlet, configurations similar to those shown in FIGS. 13A-13B can also be used to enable use of higher durometer materials, up to 90 Shore A to provide a design capable of higher operating pressure ranges while maintaining responsiveness at minimum operating pressure.

FIGS. 14A-14B show embodiments in which the internal rail to rail distance is changed linearly tapering outward and then inward over the upstream to downstream direction, with dimension A being greater than dimensions B and C in each embodiment. Dimensions B and C could be equal, dimension B could be less than dimension C, or dimension B could be greater than dimension C in each embodiment. Included are both generally symmetrical (FIG. 14A) and non-symmetrical (FIG. 14B) configurations. In FIG. 14A, the rails 1405a and 1405b are both tapered and, in addition, rail 1405a includes a tapered step portion 1410a and rail 1405b includes a tapered step portion 1410b. Although the tapered step portions 1410a and 1420b are not symmetrical, the remaining portions of the rails 1405a and 1405b are generally symmetrical within the pressure responsive section 1416a. In FIG. 14B, the rail 1405c is not tapered and rail 1405d is tapered and includes a tapered step portion 1410d within the pressure responsive section 1416b. By adjusting the angles of the tapering internal rail to rail distance, the features within the pressure responsive sections can be tuned to respond in conjunction with each other in order to dissipate the pressure applied. This configuration assists in obtaining the participation of resistance features within the middle of the overall length to be active at lower pressures. As FIG. 14B illustrates, tuning element rail to rail distance is being used non-symmetrically. It can be similarly useful to use any of the other tuning elements in a non-symmetrical manner. For example, although not depicted, at a given position along the length of the pressure responsive section, a rail corner might be used on only one of the rails, or could be used on both rails but differing in dimension at each of the rails.

Generally, these examples illustrate that non-symmetrical configurations of tuning elements may be used along the pressure responsive section. Additional examples include, but are not limited to, including a rail corner on one side or rail corners on opposing sides having different configurations, including features with different profiles, including features with different thicknesses, or any suitable combination. Using "stiffer" features on one side may be useful, for example, for seamed installations where there may be a non-symmetrical load path for the hoop stress of the overall assembly. Furthermore, each of the tuning elements in Table 1, alone or in any combination, may be used non-symmetrically along the pressure responsive section.

FIGS. 15A-15B show configurations wherein the inside rail to rail dimensions do not follow linear taper characteristic, but rather curvilinear characteristics, with dimension A being larger than dimensions B and C in each embodiment. Dimensions B and C could be equal, dimension B could be less than dimension C, or dimension B could be greater than dimension C in each embodiment. In FIG. 15A, rail 1505a includes a tapered step portion 1510a and rail 1505b includes a tapered step portion 1510b within the pressure responsive section 1516a. In FIG. 15B, rails 1505c and 1505d curve inward toward each other and then outward away from each other within the pressure responsive section

1516b. Various configurations of curvilinear rails may be used. Curvilinear versions of the emitters shown in FIGS. 5C, 11A-11B, 12A-12C, 13A-13B, 14A-14B, 20A-20C, 22A-22C, 23A-23D, 24A-24F, 25A-25F, and 28 can be employed as well. Also within FIGS. 15A-15B, is a representation of a curvilinear configuration wherein the rail to rail dimension is narrower along the middle of the overall length. This configuration is useful if tuning for a specific pressure range/flow rate combination delaying the closure of the middle features until higher flow/pressure points of the emitter flow versus pressure performance. The use of curvilinear characteristic of internal rail to rail dimension can provide for finer tuning of flow versus pressure characteristics.

Each of the embodiments shown in FIGS. 11A-15B show configurations wherein the rail to rail distance tuning element is used to tune emitter response. To provide additional tuning capabilities, the tuning elements (b) through (o) shown in FIGS. 5A-5E may also be used in conjunction, in any combination, with configurations such as those in FIGS. 11A-15B.

FIGS. 16A-18D include embodiments in which the tuning of the behavior of the features within the pressure responsive region can be accomplished, in whole, or in part, by the addition of cross sectional rigidity in the form of additional rail features external to the rails which contact the flow within the emitter itself. For example, in FIG. 16A, outer rails 1620a and 1620b are positioned proximate exterior sides of rails 1605a and 1605b, respectively, and a distal end of the pressure responsive section 1616a. In FIG. 16B, outer rails 1620c and 1620d, which are shorter in length than outer rails 1620a and 1620b in FIG. 16A, are positioned proximate exterior sides of rails 1605c and 1605d, respectively, and a distal end of the pressure responsive section 1616b. In FIG. 16C, outer rails 1620e and 1620f, which are thicker than outer rails 1620a and 1620b in FIG. 16A, are positioned proximate exterior sides of rails 1605e and 1605f, respectively, and a distal end of the pressure responsive section 1616c. In FIG. 16D, outer rails 1620g and 1620h, which are further away from rails 1605g and 1605h than outer rails 1620a and 1620b in FIG. 16A, are positioned proximate exterior sides of rails 1605g and 1605h, respectively, and a distal end of the pressure responsive section 1616d.

FIGS. 17A-17D and FIGS. 18A-18D include embodiments with outer rails in different positions and having different configurations. In FIG. 17A, there are outer rails 1720a and 1720b proximate exterior sides of rails 1705a and 1705b, respectively, tapering outward toward a distal end of the pressure responsive section 1716a and outer rails 1721a and 1721b proximate exterior sides of rails 1705a and 1705b, respectively, tapering outward toward a proximal end of the pressure responsive section. In FIG. 17B, there are outer rails 1720c and 1720d extending outward from exterior sides of rails 1705c and 1705d, respectively, tapering outward toward a distal end of the pressure responsive section 1716b. In FIG. 17C, there are outer rails 1722e and 1722f positioned generally parallel to and proximate exterior sides of rails 1705e and 1705f and a middle portion of the pressure responsive section 1716c. In FIG. 17D, the outer rails 1722g and 1722h extend further away from the rails 1705g and 1705h, respectively, in middle portions of the outer rails 1722g and 1722h proximate a middle portion of the pressure responsive section 1716d. In FIG. 18A, outer rails 1820a and 1820b are proximate exterior sides of rails 1805a and 1805b, respectively, and a distal end of the pressure responsive section 1816a, and outer rails 1820a and 1820b are thicker proximate their distal ends. In FIG. 18B, outer rails 1822c and 1822d extend outward from the rails 1805c and 1805d, respectively, proximate a middle portion of the pressure responsive section 1816b, and outer rails 1822c and 1822d are thicker proximate a middle portion thereof. Observing FIGS. 17B and 18B, it is apparent that external rails can co-merge with internal rails in one or more locations along the pressure responsive section. In FIG. 18C, outer rails 1820e and 1820f extend outward from the rails 1805e and 1805f, respectively, proximate a distal end of the pressure responsive section 1816c, and outer rails 1820e and 1820f are thicker proximate their distal ends. In FIG. 18D, outer rails 1821g and 1821h extend outward from the rails 1805g and 1805h, respectively, proximate a proximal end of the pressure responsive section 1816d, and outer rails 1821g and 1821h are thicker proximate their proximal ends.

With this approach, there are many options for tuning the behavior, among them: the length over which the additional rail features (outer rails) are applied, the position where the additional rail features are applied, the distance away from other rails, the thickness of the additional rails, the angle of the additional rails, and the tapering of the additional rails. Examples of some of these options are illustrated in these figures. It should be noted that although depicted as generally symmetrical in FIGS. 16A-18D, the additional rails and other features can also be applied in a non-symmetrical fashion. For understanding purposes, it should be stated that FIG. 17A can achieve a similar cross sectional stiffness trend versus pressure responsive section position as is achieved by FIG. 15A (not identical because inner rail to rail distance does not change and therefore feature stiffness differs, but illustrative of how similar type of behavior can be achieved via additional external rails). Similarly, the trend in cross sectional stiffness for FIG. 17D and FIG. 15B are similar (although not identical due to dissimilar rail to rail distances, but illustrative of how similar type of behavior can be achieved via additional external rails). Also, FIG. 17A illustrates that more than one set of external rails can be employed to allow tuning of different responses along the length of the pressure responsive section. FIGS. 18A-18D indicate that the additional stiffness can also be applied by changing the thickness of the outer rails connected to the rails that are in contact with the inside of the emitter itself. Similar to the preceding, the location of, length of, and profile of the added thickness can be adjusted to tune the behavior of the pressure responsive region.

FIGS. 19A-19D show embodiments that are conceptually similar to those of FIGS. 16A-16D except implementing an ability to tune feature behavior by adding more than one external rail feature and optionally including interruptions in one or more of the external rail features. For example, in FIG. 19A, outer rails 1920a and 1920b each include two parallel rails of equal length that are also parallel with the rails 1905a and 1905b, respectively, proximate a distal end of the pressure responsive section 1916a. In FIG. 19B, outer rails 1920c and 1920d each include two parallel rails of different lengths, the outermost rail being shorter, that are also parallel with the rails 1905c and 1905d, respectively, proximate a distal end of the pressure responsive section 1916b. In FIG. 19C, outer rails 1920e and 1920f each include two parallel rails of different lengths, the outermost rail being shorter and dashed or including interruptions, that are also parallel with the rails 1905e and 1905f, respectively, proximate a distal end of the pressure responsive section 1916c. In FIG. 19D, outer rails 1920g and 1920h each include two parallel rails of different lengths, the outermost rail being shorter, that are dashed or include interruptions and are also parallel with the rails 1905g and 1905h, respectively, proximate a distal end of the pressure responsive section 1916d and the innermost rail extending into a middle portion of the pressure responsive section 1916d. From these examples, it is apparent that tuning can be further modified through combinations such as varying the number of external rails used, the placement of the rails along the length of the pressure responsive section, the thicknesses of the rails, the distances the rails are apart, and angles of the rails relative to the rails which contact the flow within the emitter. Additionally, because the added external rails do not serve as walls for the flow within the emitter itself, the added external rails can adjust structural rigidity while being either continuous or discontinuous. Further, the use of more than one added rail feature can be used with configurations portrayed within FIGS. 16A-18D, 20A-20C, 22A-22C, and 23A-23D.

Figure 20A:
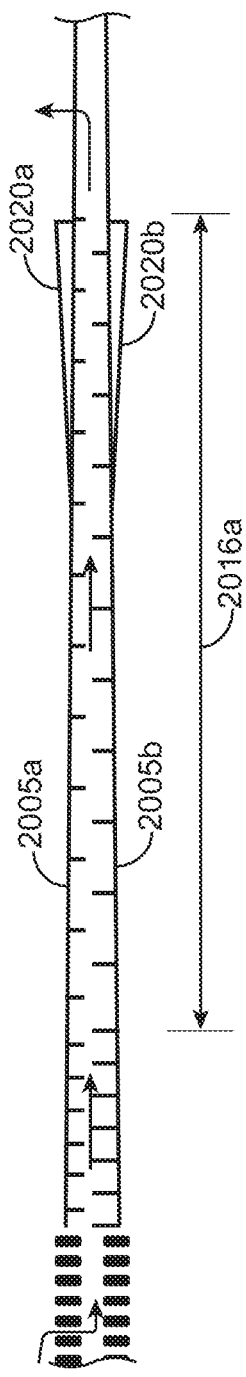
FIG. 20A illustrates another embodiment pressure responsive emitter with internal tapering rails and external rails.
Figure 20B:
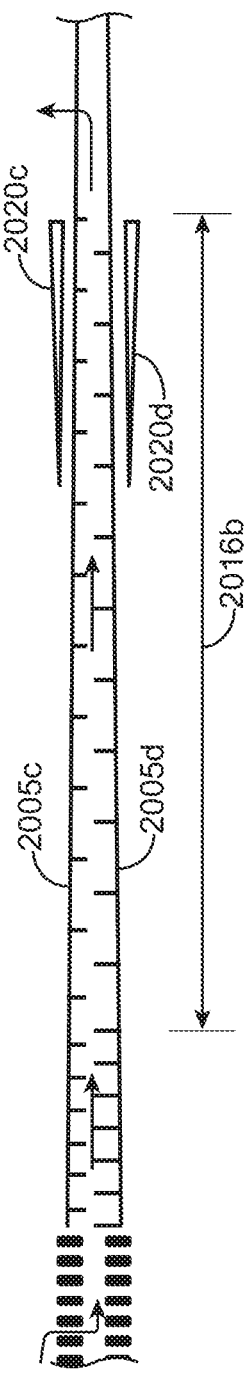
FIG. 20B illustrates another embodiment pressure responsive emitter with internal tapering rails and external rails.
Figure 20C:
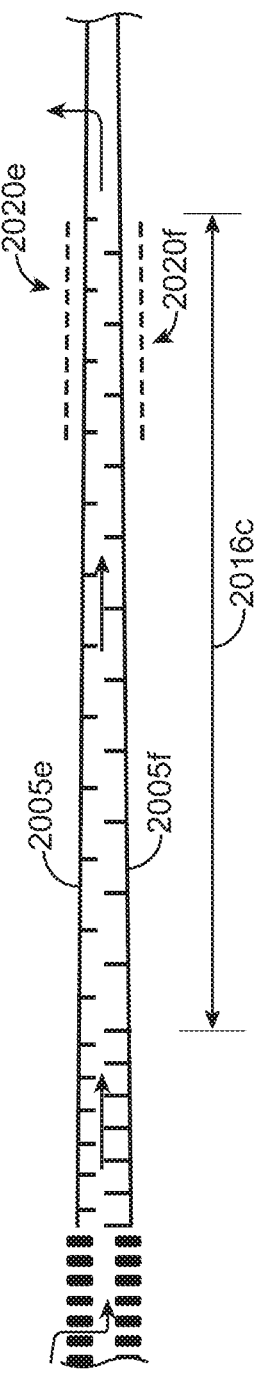
FIG. 20C illustrates another embodiment pressure responsive emitter with internal tapering rails and external rails.

FIGS. 20A-20C show embodiments where additional rail features can also be used in conjunction with configurations wherein internal rail to rail dimensions are also used as tuning techniques. FIGS. 20A-20C also indicate that the additional external rails which do not have to be continuous. To save material, the additional features can be discontinuous. In FIG. 20A, rails 2005a and 2005b are tapered and outer rails 2020a and 2020b extend outward from the rails 2005a and 2005b, respectively, proximate a distal end of the pressure responsive section 2016a, and outer rails 2020a and 2020b are thicker proximate their distal ends. In FIG. 20B, rails 2005c and 2005d are tapered and outer rails 2020c and 2020d are proximate exterior sides of rails 2005c and 2005d, respectively, and a distal end of the pressure responsive section 2016b, and outer rails 2020c and 2020d are thicker proximate their distal ends. In FIG. 20C, rails 2005e and 2005f are tapered and outer rails 2020e and 2020f, which are dashed or include interruptions, are proximate and parallel to exterior sides of rails 2005c and 2005d, respectively, and a distal end of the pressure responsive section 2016c.

Figure 21A:
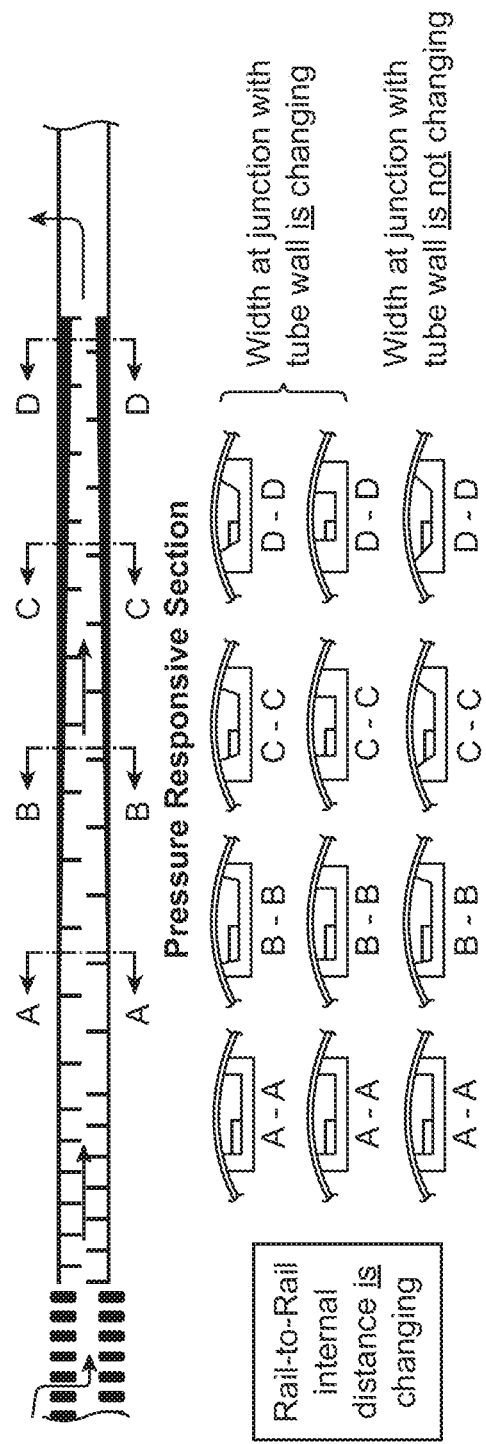
FIG. 21A illustrates examples of rail tuning via modifications to cross section aspect ratios along the lines A-A, B-B, C-C, and D-D.
Figure 21B:
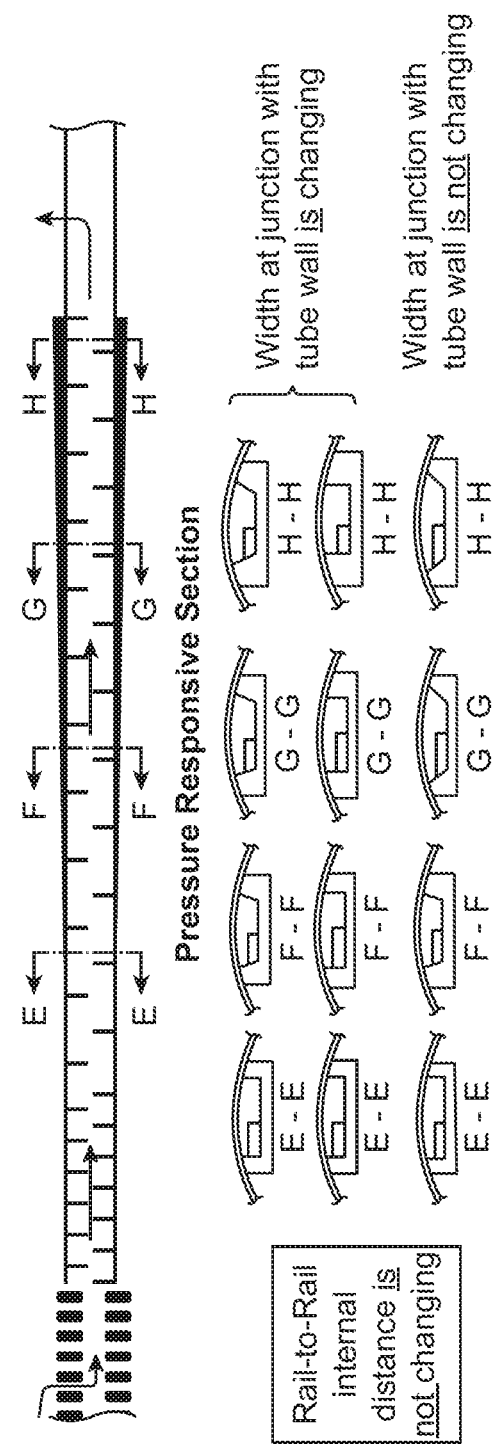
FIG. 21B illustrates examples of rail tuning via modifications to cross section aspect ratios along the lines E-E, F-F, G-G, and H-H.

FIGS. 21A-21B show embodiments that demonstrate the aspect ratio of the cross section of the rails can be modified as a means of tuning the rails in order to achieve desired closure of features in response to increasing pressure. FIGS. 21A-21B show example configurations at various cross sections in which the cross sectional aspect ratio is generally trapezoidal and generally rectangular, with example configurations in which the internal rail to rail distance narrows with changes in rail aspect ratios. FIGS. 21A-21B also show example configurations in which the internal rail to rail distance does not change with changes in rail aspect ratios and show example configurations that do change and do not change the width of the rail at the junction with the tube inner wall. Although not shown, it is also apparent that different aspect ratios such as trapezoids in which the triangular portion changes on the surface not facing the inside of the pressure responsive region can be used. Similarly, aspect ratios in which triangular portions face both inside and outside can be used. Each of these methods of changing the aspect ratio of the cross section of the rails provide a manner by which tuning can be accomplished in which deflection of individual resistance features can be applied at desired flow/pressure condition to meet desired overall flow versus pressure performance curve.

Figure 22A:
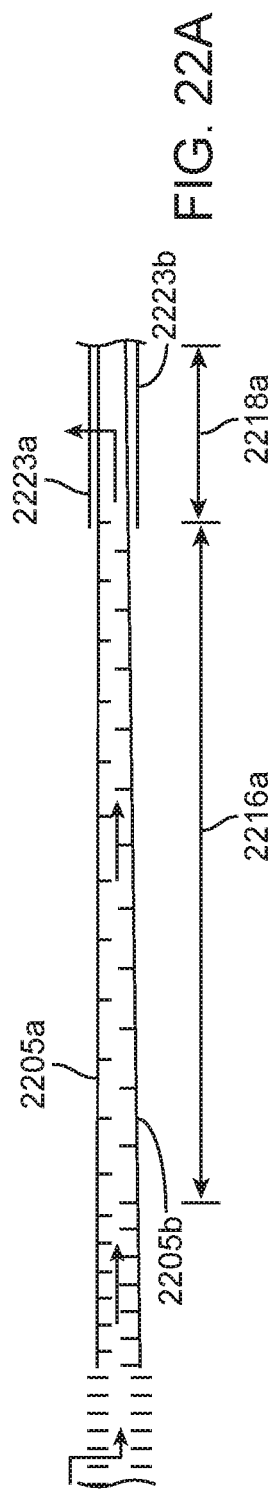
FIG. 22A illustrates another embodiment pressure responsive emitter with a stiffened outlet chamber.
Figure 22B:
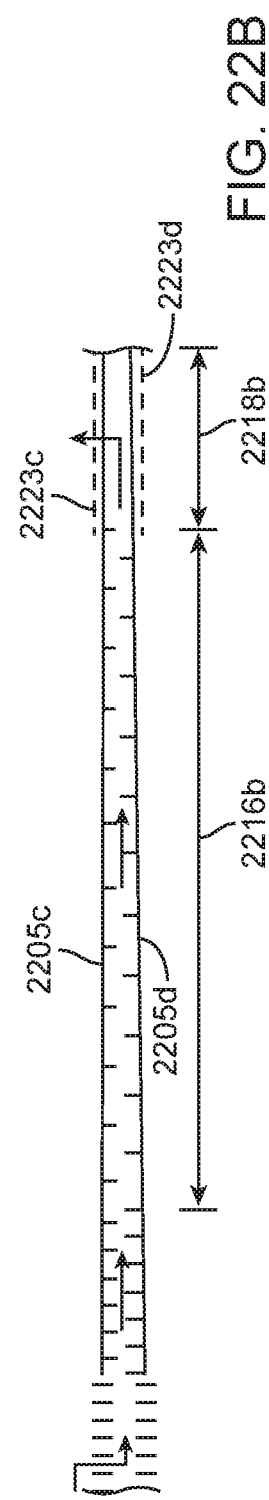
FIG. 22B illustrates another embodiment pressure responsive emitter with a stiffened outlet chamber.
Figure 22C:
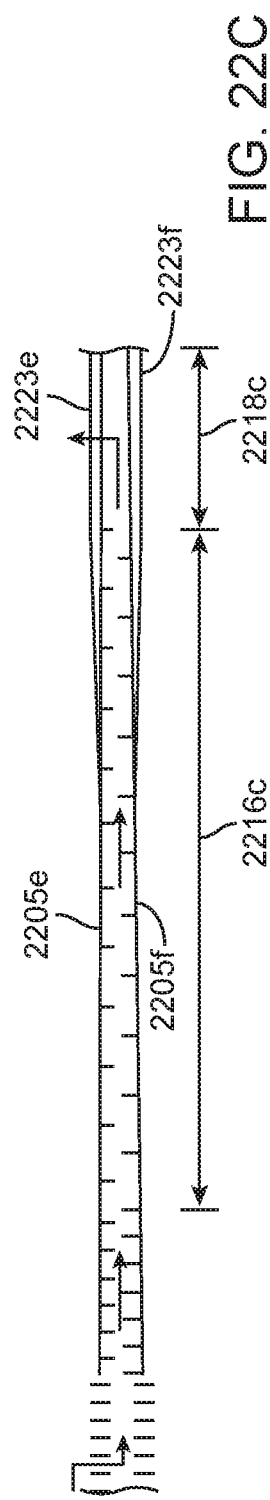
FIG. 22C illustrates another embodiment pressure responsive emitter with a stiffened outlet chamber.
Figure 25A:
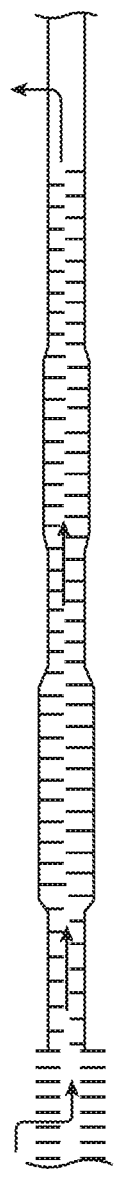
FIG. 25A illustrates another embodiment pressure responsive emitter with multi-profile rail portions.
Figure 25B:
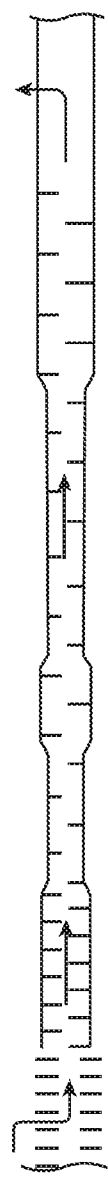
FIG. 25B illustrates another embodiment pressure responsive emitter with multi-profile rail portions.
Figure 25C:
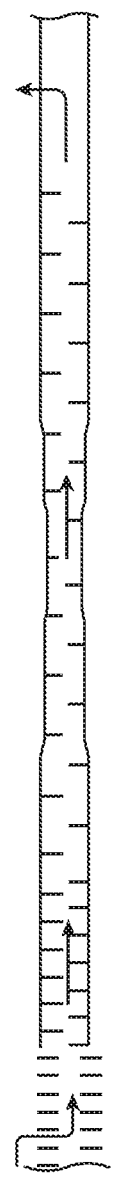
FIG. 25C illustrates another embodiment pressure responsive emitter with multi-profile rail portions.
Figure 25D:
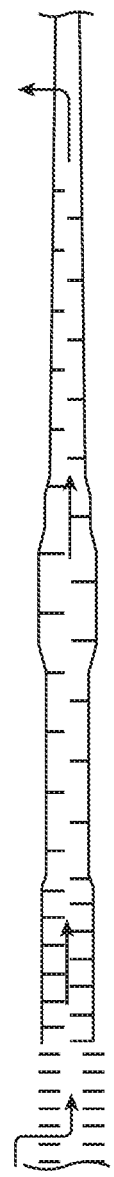
FIG. 25D illustrates another embodiment pressure responsive emitter with multi-profile rail portions.
Figure 25E:
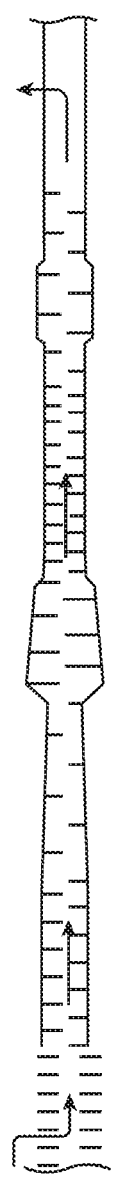
FIG. 25E illustrates another embodiment pressure responsive emitter with multi-profile rail portions.
Figure 25F:
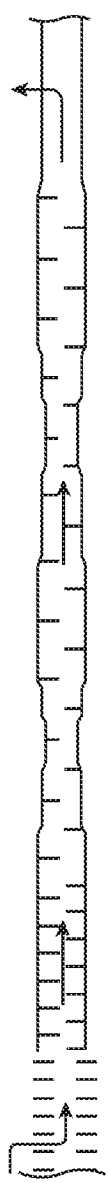
FIG. 25F illustrates another embodiment pressure responsive emitter with multi-profile rail portions.

FIGS. 22A-22C show embodiments with additional features that can also be added external to the rails for the outlet region. For example, in FIG. 22A, the outer rails 2223a and 2223b extend parallel to rails 2205a and 2205b and proximate the outlet section 2218a, and the rails 2205a and 2205b are tapered within the pressure responsive section 2216a in this example. In FIG. 22B, the outer rails 2223c and 2223d, which are dashed or include interruptions, extend parallel to rails 2205c and 2205d and proximate the outlet section 2218b, and the rails 2205c and 2205d are tapered within the pressure responsive section 2216b in this example. In FIG. 22C, the outer rails 2223e and 2223f extend outward from rails 2205e and 2205f from proximate the pressure responsive section 2216c to the outlet section 2218c, and the rails 2205e and 2205f are tapered within the pressure responsive section 2216c in this example. This can be particularly useful in avoiding the floor in the outlet region from deflecting upward and partially sealing the outlet. The external features can be either continuous or discontinuous. FIG. 22C also shows that features added to protect the outlet region can also extend upstream as part of technique to tune the pressure responsive region.

FIGS. 23A-23D show embodiments with additional features that can be added along the entire length of the emitter, or along a substantial length of the emitter. In FIG. 23A, outer rails 2324a and 2324b extend along a length of rails 2305a and 2305b, which in this example are tapered, forming the pressure reducing section 2314a, the pressure responsive section 2316a, and the outlet section 2318a. FIG. 23B is similar to FIG. 23A but the outer rails 2324c and 2324d are dashed or includes interruptions along a length of rails 2305c and 2305d. In FIG. 23C, rail 2305e is not tapered while rail 2305f is tapered, and an outer rail 2324f, which is dashed or includes interruptions, extends along a length of rail 2305f. In FIG. 23D, rail 2305g is not tapered while rail 2305h is tapered, and an outer rail 2324h, which is dashed or includes interruptions, extends along a length of rail 2305h from proximate a middle of the pressure responsive section 2316d to the outlet section 2318d. These embodiments enable the use of elastomeric materials with reduced durometer, as low as 10 to 20 Shore A durometer. By creating an architecture to stiffen the cross section, low durometer materials formerly unsuitable for use can be used. FIGS. 23A-23D also depicts that the features can be discontinuous. These features can be used in both symmetrical and non-symmetrical fashion.

FIGS. 24A-24G show embodiments using non-linear elements, rather than straight linear elements. FIG. 24A illustrates a non-linear taper of rail 2405b relative to rail 2405a and an outer rail 2424b extending proximate the rail 2405b along the pressure responsive section and the outlet section. FIG. 24B illustrates a non-linear taper of rail 2405d relative to rail 2405c with outer rails 2420c and 2420d extending outward from the rails 2405c and 2405d, respectively, proximate a distal end of the pressure responsive section, and outer rails 2420c and 2420d are thicker proximate their distal ends. FIG. 24C illustrates a non-linear taper of rail 2405f relative to rail 2405e with proximal ends of outer rails 2420e and 2420f contacting the rails 2405e and 2405f and distal ends of outer rails 2420e and 2420f spaced from the rails 2405e and 2405f. FIG. 24D illustrates a non-linear taper of rail 2405h relative to rail 2405g with outer rails 2420g and 2420h, which are dashed or include interruptions, proximate the distal end of the pressure responsive section. FIG. 24E illustrates a non-linear taper of rail 2405j relative to rail 2405i with thicker walls 2420i and 2420j extending inward relative to the rails 2405i and 2405j proximate the distal end of the pressure responsive section. FIG. 24F illustrates a non-linear taper of rail 2405l relative to rail 2405k with outer rails 2423k and 2423l proximate the outlet section. FIG. 24G illustrates a non-linear taper of rail 2405n relative to rail 2405m and outer rails 2420m and 2420n each including two rails, the outermost rails being shorter in length than the innermost rails. These examples are representative because they can accommodate tuning of the pressure responsive section by use of curvilinear elements in place of any or all linear elements. The objective is to tune the geometry in a manner to which features at a given position along the pressure responsive section respond at differential pressure desired in order to provide the overall desired relationship between pressure and flow. Combinations of linear and curvilinear, continuous and stepped, angled and curvilinear are further examples of combinations which can be utilized.

FIGS. 25A-25F include embodiments using more than one location of reduced cross sectional stiffness (wider rail to rail distance in these examples, but could be accomplished using other tuning elements instead) along the length of the pressure responsive section. This is most especially useful when designing an emitter where large quantities of features are desired in order to dissipate the line pressure. By employing multiple locations of reduced cross sectional stiffness, a larger number of features can be active for a given increment of the overall operating pressure range (for perspective, at flows on the order of 0.0675 gph, more than 150 features may be desired in order to create sufficient resistance to flow. Without the ability to use tuning to engage larger numbers of features, the only option for such low flow emitters is to use a limited number of features, each of which with reduced dimensions that are limited with regard to resistance to blockage from debris).

The tuning elements defined in FIGS. 5A-5E, elements (b) through (o), can also be used in conjunction, in any combination, with configurations such as those in FIGS. 16A-25F. The tuning elements defined in FIGS. 5A-5E, elements (b) through (o), can also be used in conjunction, in any combination, with configurations that hold rail to rail distance constant, and any external features constant. Three examples of emitters are shown in FIGS. 26A-26C wherein pressure responsive section tuning is accomplished through the combination of three tuning elements: rail corner heights, transverse rail gaps, and floor profiles. FIG. 26A illustrates rails 2605a and 2605b and outer rails 2624a and 2624b, FIG. 26B illustrates rails 2605c and 2605d and outer rails 2624c and 2624d, and FIG. 26C illustrates rails 2605e and 2605f and outer rails 2624e and 2624f. FIG. 26D illustrates example cross sections of the emitters taken along the lines A-A, B-B, C-C, D-D, E-E, and F-F in FIGS. 26A-26C. In FIG. 26D cross section A-A, the rails 2605a/2605c and 2605b/2605d and the outer rails 2624a/2624c and 2624b/2624d are illustrated along with floors 2606a (FIG. 26A) and 2606b (FIG. 26B) and features 2607a (FIG. 26A) and 2607b (FIG. 26B). FIG. 26D cross section C-C illustrates the rail corners 2611a/2611c and 2611b/2611d from the corresponding rails in FIGS. 26A and 26B. FIG. 26D cross section D-D illustrates the rails 2605e and 2605f and the outer rails 2624e and 2624f along with the floor 2606c and feature 2607c. FIG. 26D cross section F-F illustrates rail corners 2611e and 2611f. The relationships among the cross sections with respect to these tuning elements are shown in Table 3:

TABLE 3

Relationships Among Cross Sections with Regard to Tuning Elements

| Tuning Element | Cross Sections |
| --- | --- |
| Rail Corner Height | A-A < B-B < C-C |
| | D-D < E-E < F-F |
| Transverse Rail Gaps | A-A < B-B < C-C |
| | D-D < E-E < F-F |

TABLE 3-continued

Relationships Among Cross Sections with Regard to Tuning Elements

| Tuning Element | Cross Sections |
| --- | --- |
| Floor Profiles | A-A and D-D are concave |
| | B-B and E-E have uniform thickness |
| | C-C and F-F are convex |

There are a number of possible configurations, combinations, and tuning elements which enable tuning of emitter flow versus pressure performance curves. The strength of these configurations lies within the ability to create at each feature along the length of the pressure responsive section a unique relationship between differential pressure and feature deflection. Differential pressure in this context is pressure in the tube minus pressure inside the pressure responsive section local to the given feature. For a given feature, the summation of pressure drop created by all features upstream of it creates the differential pressure between the given feature and the pressure within the tube. This differential pressure is the driving force to deflect the given feature. Said slightly differently, using embodiments such as those described herein allow an emitter to inc Because the next feature is both less stiff after tuning and is receiving a greater differential, and so is the next feature, and the next feature etc., there is a compounding effect. With the embodiments, there can be a large number of features in series and small tuning adjustments can shift flow versus pressure curves as needed. Note that the examples in FIG. 27 are not depicted as taking advantage of other geometric tuning parameters (b) through (o) in FIGS. 5A-5E.

FIGS. 28A-31E as a group are shared to provide further insight. FIGS. 28A and 28B (cross section taken along the lines 28B-28B in FIG. 28A) and FIGS. 28C and 28D (cross section taken along the lines 28D-28D in FIG. 28C), respectively, show example tuned and non-tuned emitters. Both emitters have the same number of features in the pressure reducing section and the same number of features in the pressure responsive section. The emitters are designed for an operating pressure from 5 to 12 psi, and to have rated flow at 10 psi. The comparative flow versus pressure curve is provided in FIG. 28E. The benefit of the tuned emitter is apparent when comparing the consistency of flow versus pressure compared to the non-tuned emitter. Further explanation is provided in FIGS. 29A-31E.

Figure 29A:
FIG. 29A illustrates an example tuned rail.
Figure 29B:
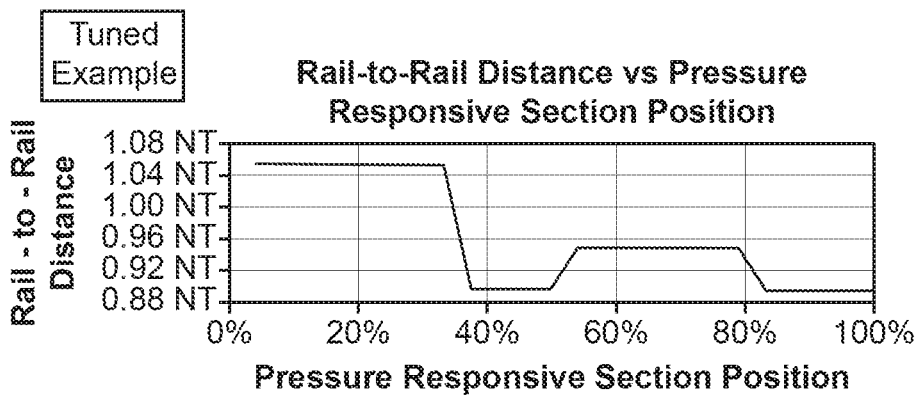
FIG. 29B illustrates a relationship of a rail to rail distance versus a pressure responsive section position for the rail tuned example shown in FIG. 29A.
Figure 29C:
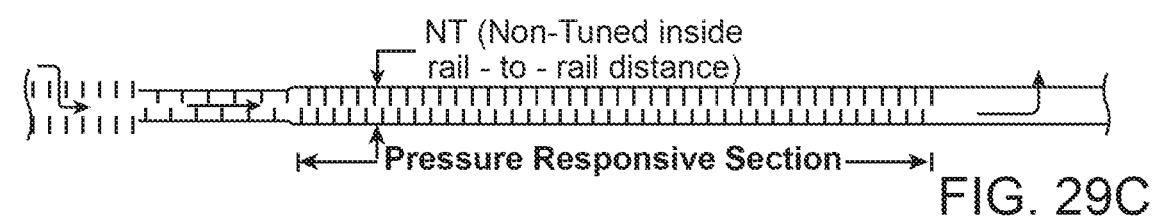
FIG. 29C illustrates an example non-tuned rail.
Figure 29D:
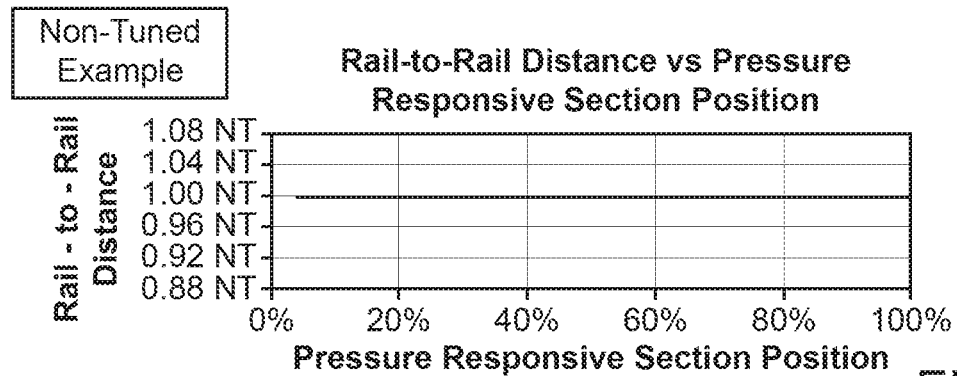
FIG. 29D illustrates a relationship of rail to rail distance versus a pressure responsive section position for the rail tuned example shown in FIG. 29C.

FIGS. 29A-29E show comparative rail to rail distances for the tuned and non-tuned emitters. FIG. 29C defines "NT" as the rail to rail distance for the non-tuned emitter. Dimension "NT" is a function of the material being used, in addition to performance parameters of flowrate and operating pressure range. FIG. 29D shows the rail to rail distance versus the pressure responsive section position for the non-tuned emitter. FIG. 29A shows the comparative rail to rail distance for an example tuned emitter. FIG. 29B shows the rail to rail distance versus the pressure responsive section position for the example tuned emitter. For example, at a position 20% along the length of the pressure responsive section, the tuned emitter has a rail to rail distance of 1.05 NT (i.e. 5% greater than the rail to rail distance for the non-tuned emitter with the same material).

Figure 29E:
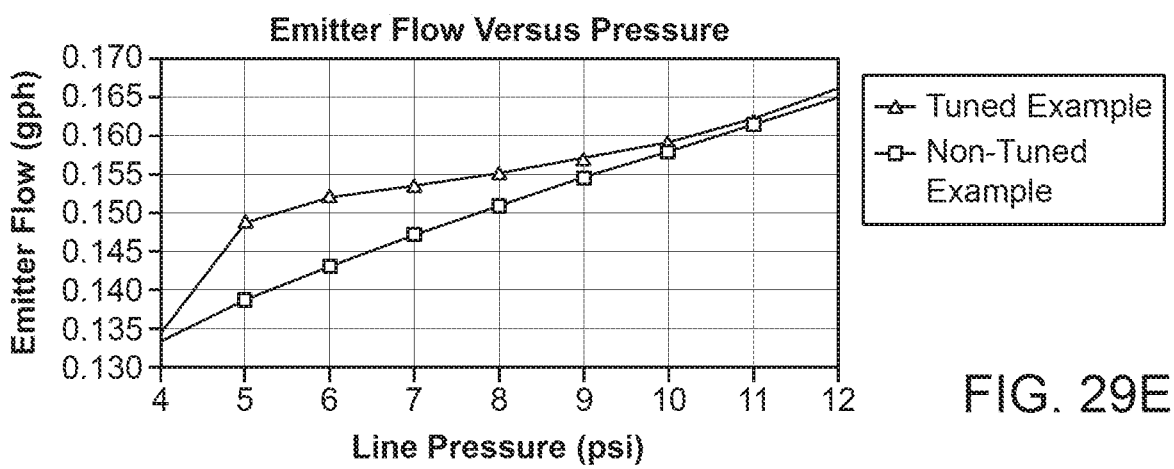
FIG. 29E is a graph comparing flow versus pressure for the tuned rail example illustrated in FIG. 29A and the non-tuned rail example illustrated in FIG. 29C.

FIG. 29E shows the resultant relationship between flow and pressure for the two emitters of FIGS. 29A (tuned emitter) and 29C (non-tuned emitter). The tuned and the non-tuned emitters have similar flows (approximately 0.157 gph) at rated pressure condition of 10 psi. However, it can be observed that the tuned example emitter provides a markedly improved consistency of flow over the 5 to 10 psi pressure range. It can be observed that the greatest benefit occurs at lower pressures (5 through 8 psi for example). This occurs because the tuned emitter includes a benefit of being able to have more features active at a given pressure, and the tuning has been set in this example design to increase the number of upstream features active at lower pressures (i.e. tuned emitter features at lower % positions along the pressure responsive section are active at lower pressures, when compared with the non-tuned emitter). This is further explained in FIGS. 30A-31E.

Figure 30A:
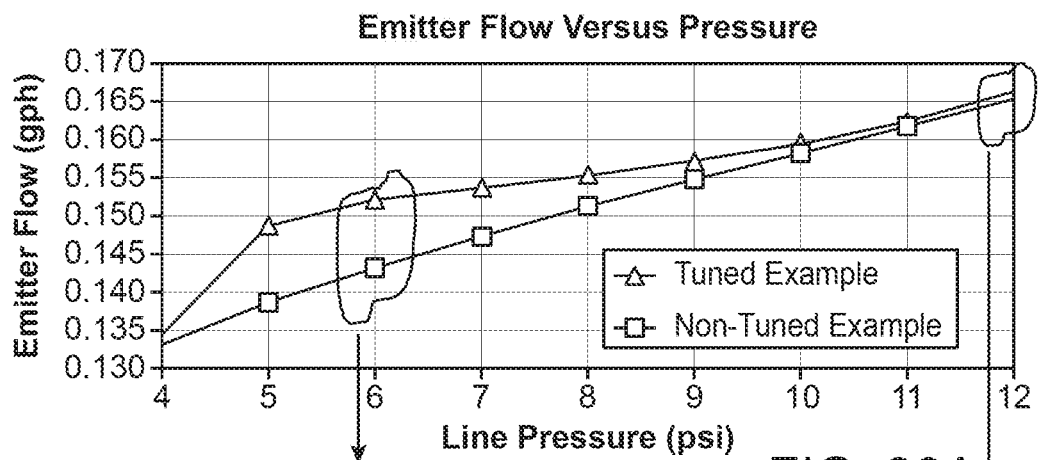
FIG. 30A is the graph comparing flow versus pressure shown in FIG. 29E with data at 6 psi and 12 psi highlighted.
Figure 30B:
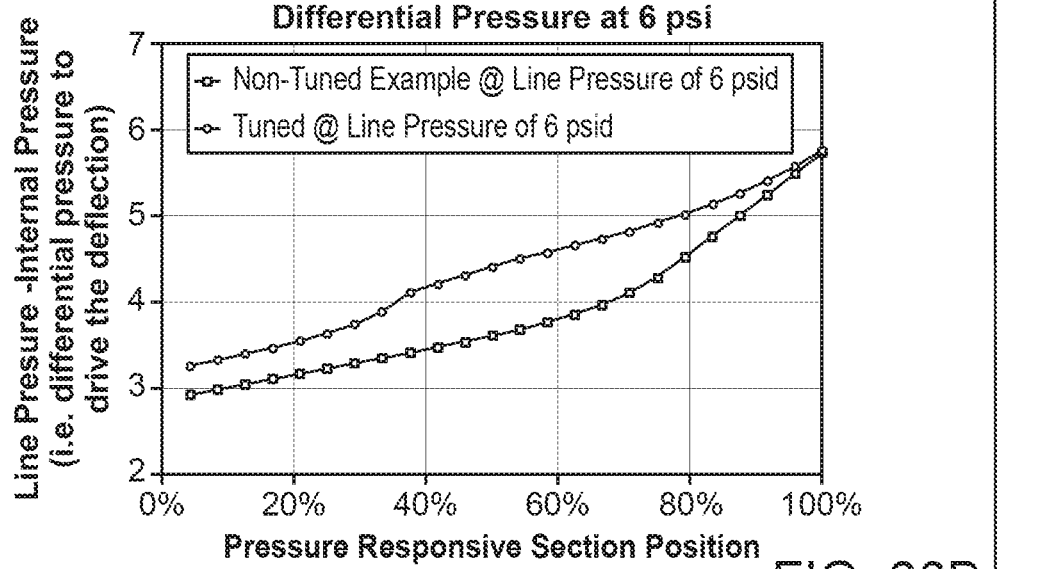
FIG. 30B is a graph illustrating the internal pressure versus the pressure responsive section position for 6 psi shown in FIG. 30A.
Figure 30C:
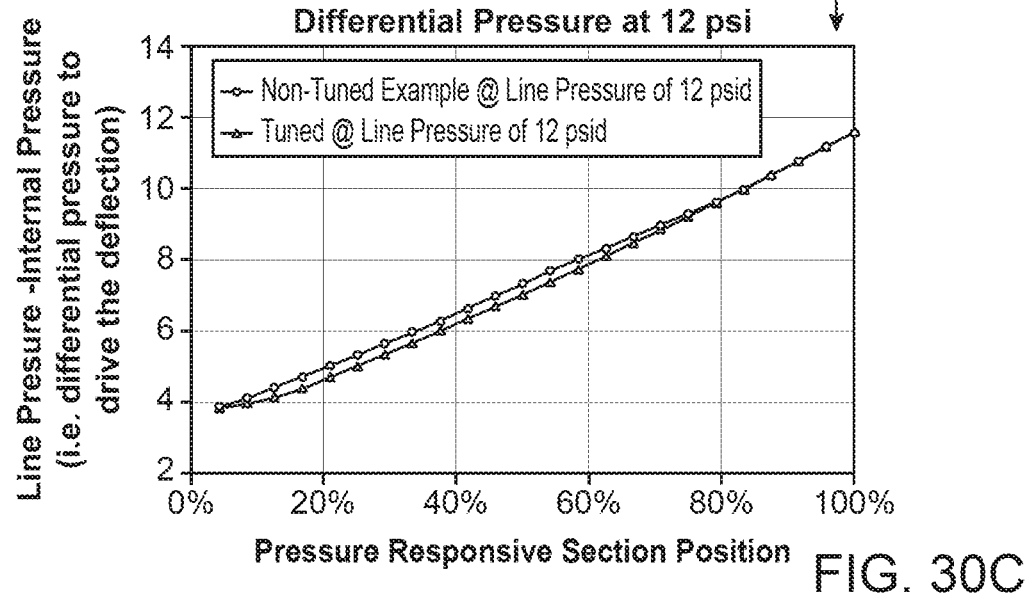
FIG. 30C is a graph illustrating the internal pressure versus the pressure responsive section position for 12 psi shown in FIG. 30A.

FIG. 30A repeats the flow versus pressure curve from FIG. 29E for purposes of showing the line pressures at which data in FIGS. 30B and 30C are applicable. FIG. 30B shows the differential pressure (P-Line minus P-Internal) local to each feature along the length of the pressure responsive section under a condition having 6 psi line pressure. It can be seen that, with exception of features at 100% position along pressure responsive section (which have the same differential pressure for both because is adjacent to the outlet), all features within the tuned emitter have a higher differential pressure than their corresponding features on the non-tuned geometry. It can also be seen that for the non-tuned geometry, there is an upward slope from features at 70% to 100% position along pressure responsive section. This is characteristic of non-tuned designs which by nature experience closure from the downstream to upstream direction. This behavior is inherent in an un-tuned emitter because the downstream features closest to the outlet deflect first (i.e. at the lower end of pressure range) and generate the majority of the pressure drop, which means the upstream features do not experience a large enough differential pressure to be active at lower pressures. Recall that the differential pressure local to a specific feature is the summation of the pressure drop of all features upstream of it. When upstream features have lower differential pressures, the features adjacent downstream do not become active until higher flow occurs (because flow must increase before additional differential pressure is provided to next emitter downstream). This is further illustrated in FIGS. 31A-31E and further discussed later.

FIG. 30C shows the differential pressure (P-Line minus P-Internal) local to features at % position along the length of the pressure responsive section under a condition having 12 psi line pressure. It can be seen that at the upper design pressure (12 psi in this design) the differential pressures versus feature % position are more similar for the tuned and the non-tuned design. This occurs because these two designs were created such that with increasing pressure, by the time the upper pressure of 12 psi has been met, the majority of features are fully deflected.

Figure 31A:
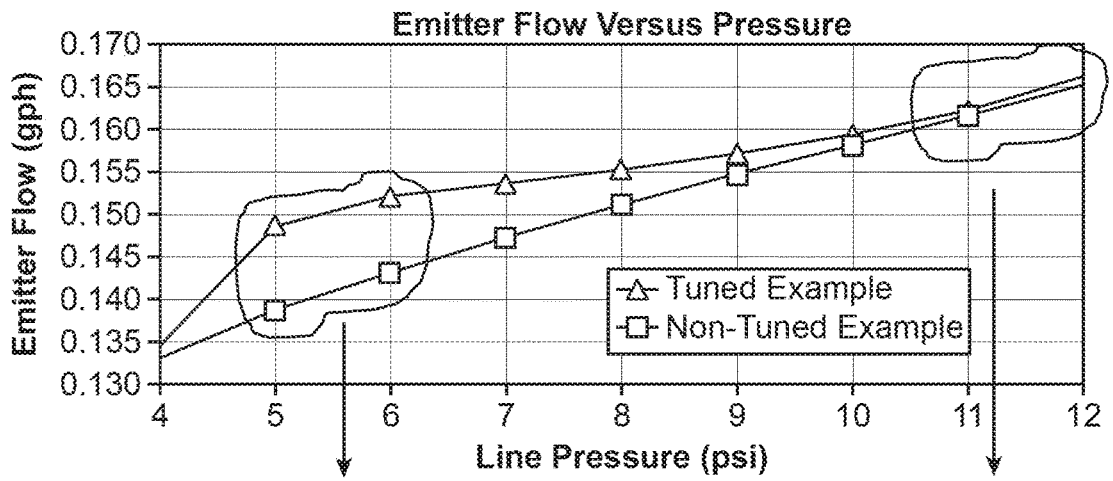
FIG. 31A is a graph illustrating flow versus pressure shown in FIG. 29E with data at 5 psi, 6 psi, 11 psi, and 12 psi highlighted.
Figure 31B:
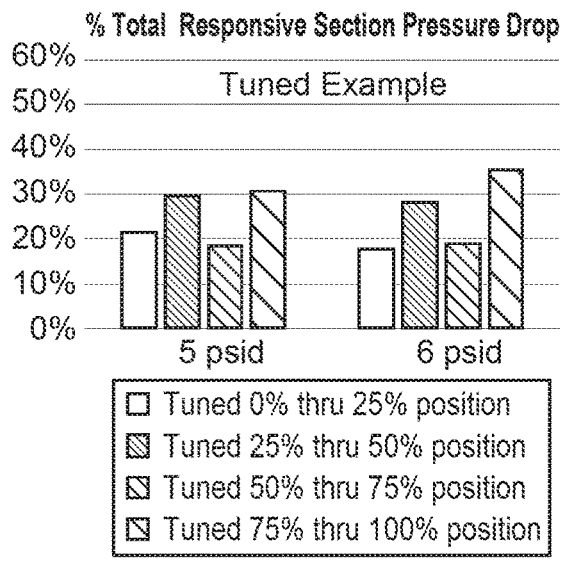
FIG. 31B is a bar graph illustrating the percentage of total responsive section pressure drop at 5 psi and 6 psi for the rail tuned example of FIG. 31A.
Figure 31C:
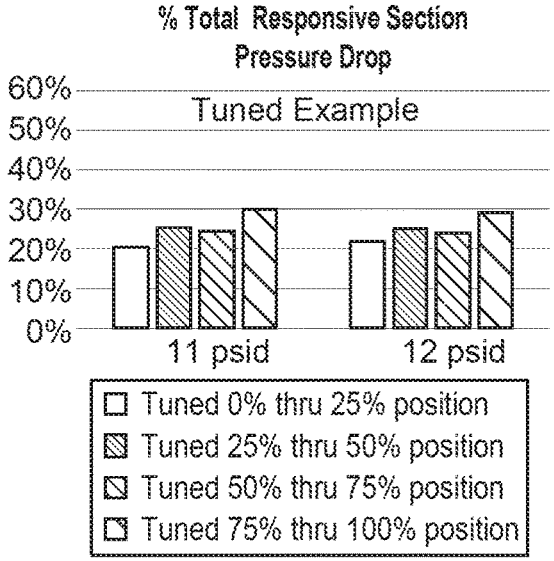
FIG. 31C is a bar graph illustrating the percentage of total responsive section pressure drop at 11 psi and 12 psi for the rail tuned example of FIG. 31A.
Figure 31D:
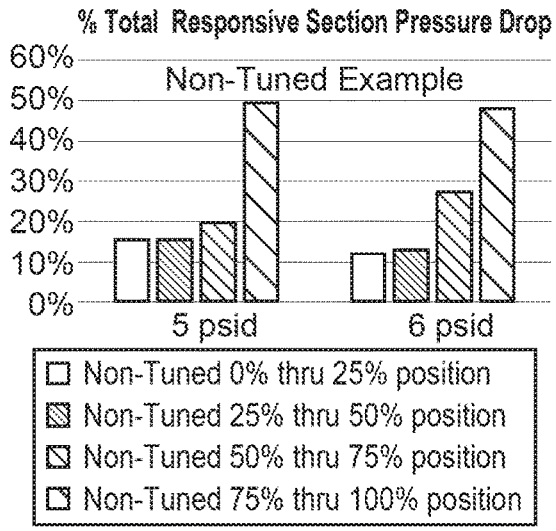
FIG. 31D is a bar graph illustrating the percentage of total responsive section pressure drop at 5 psi and 6 psi for the non-tuned example of FIG. 31A.
Figure 31E:
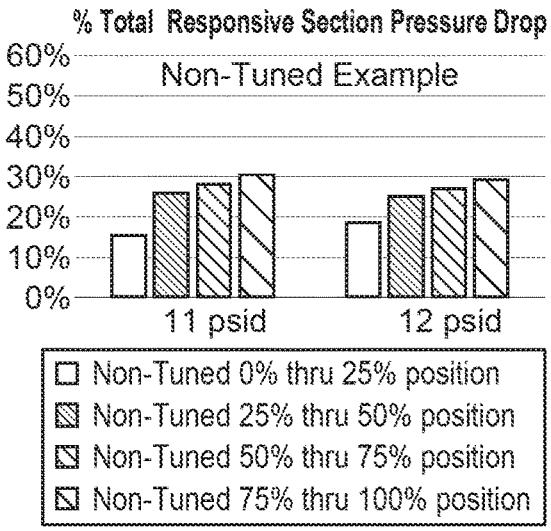
FIG. 31E is a bar graph illustrating the percentage of total responsive section pressure drop at 11 psi and 12 psi for the non-tuned example of FIG. 31A.

FIG. 31A repeats the flow versus pressure curve from FIG. 29E for purposes of showing the line pressures at which data in FIGS. 31B thru 31E are applicable. FIGS. 31B through 31E show the percentage of the total pressure responsive section pressure drop which is generated for stated groupings of features. It can be seen for example in FIG. 31B, that for the tuned emitter, at 5 psi line pressure, feature positions 0% thru 25%, 25% thru 50%, 50% thru 75% and 75% thru 100% generate an average of 25% (19% to 30%) of the total pressure drop occurring within the pressure responsive section. In contrast, it can be seen in FIG. 31D that for the non-tuned design at 5 psi line pressure, downstream features at positions 75% thru 100% alone dissipate 50% of the pressure drop, while upstream features at positions 0% thru 25% and 25% thru 50% dissipate only 15% of the pressure drop. Also in FIG. 31D is shown that at 6 psi line pressure, the participation of feature positions of 50% thru 75% increases slightly, while features at positions 0% thru 25% and 25% thru 50% decrease in the % of total pressure drop creation. Because the upstream features do not create comparable pressure drop to those of the downstream features, the result is the upward curved shape of the non-tuned emitter as shown in FIG. 30B. FIGS. 31C and 31E show that even at pressures as high at 11 psi, the tuned emitter has a greater participation of features at positions 0% thru 25%. As shared previously, with a design in which the downstream features generate the majority of the pressure drop, the upstream features do not begin to participate unless flow goes up and then the upstream pressure reducing features (mainly) create additional pressure drop to create differential to drive feature deflection. It is for this reason that the upward slope in flow from 5 psi through 10 psi occurs for the non-tuned emitter while the tuned emitter has a markedly shallower increase in flow over the 5 to 10 psi pressure range, as shown in FIG. 31A. Essentially, although both emitters have the same number of features, the tuned emitter achieves an improved uniformity of flow provided over the pressure range. Alternatively, if an emitter using tuning was designed to intentionally have the higher discharge exponent behavior as exhibited by the non-tuned emitter in FIG. 31A, then the tuned emitter could match flow versus pressure performance to that of the non-tuned emitter, except using fewer features than the non-tuned emitter. This means that shorter overall emitter lengths can be accomplished, which leads to a desirable outcome of being able to have shorter emitter spacings.

With modern drip irrigation technology, there are many combinations of flow rates, emitter spacings, tube diameters, and tube wall thicknesses in order to accommodate customer variations related to soil type, crop type, field topography, and economic circumstances (such as leased versus owned land). For example, the TORO™ AQUA-TRAXX™ (turbulent flow, non-compensating) product line has nine primary emitter flows (ranging from 0.0675 gph to 0.54 gph), eight primary emitter spacings (ranging from 4 inch to 36 inch), four primary tube diameters and eight primary wall thicknesses. The combination of tube diameters and wall thicknesses define permissible operating pressure ranges, which for a full product offering irrigation company such as The Toro Company results in ten, or more, pressure ranges. Lowest commercial operating pressure ranges are for products rated from 4 psi to 8 psi (i.e. the emitters in those products much operate from 4 to 8 psi). Higher commercial operating pressure ranges of 4 psi to 30 psi are available for medium walled tubing (i.e. the emitters in those products must operate from 4 to 30 psi). Combinations of diameters and walls lead to maximum operating pressures of 10, 12, 15, 16, 18, 20 and 22 psi between these 8 and 30 psi extremes. For a full product offering irrigation company such as The Toro Company, there are nine (or more) emitter flows used with eight (or more) spacings at ten (or more) operating pressure ranges, which makes a total combination of 720 variants (9 times 8 times 10 equals 720).

The ability to tune the pressure responsive section is valuable as an emitter architecture capable of providing discharge exponents from, for example, 0 to 0.5 (or more) over the same broad parameter range as discussed above for TORO™ AQUA-TRAXX™. To illustrate the range of options, the feature count for a 0.0675 gph emitter with 30 psi maximum operating pressure is markedly different than for a 0.54 gph emitter with 8 psi maximum operating pressure. If, for illustration purposes, both emitters had the same resistance to flow per feature, the feature count would differ by a factor of 240:1 (i.e. pressure drop per feature would be 64 times higher at 0.54 gph than at 0.0675 gph based upon pressure drop proportional to the square of flow), and dissipation of 30 psi may require 3.75 times more features than dissipation of 8 psi (64 times 3.75 equals 240). The 0.0675 gph emitter dissipating 30 psi may require 240 times more features than the 0.54 gph emitter dissipating 8 psi. The ability to tune a very broad feature quantity range in the pressure responsive section is critical to the ability to provide a broad product offering of emitters needed by modern agriculture.

A benefit is the ability to tailor emitter designs to achieve performance for a wide range of combinations. Examples of how to tailor emitter designs are illustrated in the figures, such as FIGS. 5A-5E, and Table 2. Guidance in Table 2 is expressed in terms of trends because hardness of the material being used changes with dimensions.

To provide further understanding, Tables 4, 5, and 6 share example dimensions for five different flowrates, two different pressures, and two different discharge exponents. Tables 4 and 5 are provided as examples to illustrate how emitter geometry can be adjusted to provide tuning to accommodate a range of maximum pressures (compares 16 psi to 30 psi maximum pressures for emitters both with 0.3 discharge exponent). Tables 5 and 6 are provided as examples to illustrate how emitter geometry can be adjusted to provide tuning to accommodate a range of discharge exponents (compares 0.3 and 0 exponents both with 30 psi maximum pressures). Other pressures, emitter spacings, flows, discharge exponents, materials, or emitter configurations when tuned would result in different dimensions, but the examples shown in Tables 1 through 6 are useful to guide design. For emitter configurations such as shown in FIGS. 16A through 24G, additional tuning parameters would include location, quantity, aspect ratio, angle, and thickness of any external rails, but the Table 2 described relationships between pressure responsive section feature and floor coupling with rails remains informative.

TABLE 4

Example Tuning Element Dimensional Ranges for Five Flow Variants with
Maximum Operating Pressures of 16 psi and Discharge Exponents of 0.3

| | Nominal Emitter Flow Rate (gph) | | | | |
|---|---|---|---|---|---|
| | 0.0675 | 0.135 | 0.2 | 0.27 | 0.54 |
| | Maximum Operating Pressure (psi) | | | | |
| | 16 psi | | | | |
| | Exponent | | | | |
| | 0.3 | | | | |
| (a) Internal Rail - to - Rail Dimension (inches) | 0.110 to 0.070 | | | | |
| (b) Floor thickness (inches) | .004 to .010 | | | | |
| (c) Rail Width (inches) | .005 to 0.025 | | | | |
| (d) Internal Rail Height (inches) | 0.010 to 0.025 | | | | |
| (e) Pressure Responsive Section Length (inches) | 6.9 to 8.4 | 2 to 2.75 | 0.8 to 1.2 | 0.4 to 0.7 | 0.2 to 0.35 |
| (f) Vertical Rail Gap (inches) | 0 to .006 | | | | |
| (g) Tip Height (inches) | 0.007 to 0.021 | | | | |
| (h) Transverse Rail Gap (inches) | 0.000 to 0.020 | | | | |
| (i) Feature Density (inches) | 0.045 to .07 | 0.06 to .08 | 0.06 to .09 | 0.06 to .1 | 0.08 to .15 |
| (j) Feature Angle | +/−45 degrees | | | | |
| (k) Feature Thickness | 0.010 to 0.030 | | | | |
| (l) Tip clearance (inches) | 0.005 gap, to 0.015 overlap | | 0.015 gap, to 0.015 overlap | | |
| (m) Rail corner (chamfer or radius) (inches) | chamfer - height at rail: 0 to .025, width on floor: 0 to .055 radius: 0 to .025 | | | | |

TABLE 4-continued

Example Tuning Element Dimensional Ranges for Five Flow Variants with
Maximum Operating Pressures of 16 psi and Discharge Exponents of 0.3

| | Nominal Emitter Flow Rate (gph) | | | | |
|---|---|---|---|---|---|
| | 0.0675 | 0.135 | 0.2 | 0.27 | 0.54 |
| | Maximum Operating Pressure (psi) | | | | |
| | 16 psi | | | | |
| | Exponent | | | | |
| | 0.3 | | | | |
| (n) Floor profile (inches) | Localized thinning: 0 to .005 Localized thickening: 0 to .005 | | | | |
| (o) Feature Contour | 0.01 inch radius to infinite (i.e. straight, no radius) | | | | |
| Material Hardness | 60 to 80 Shore A Durometer | | | | |

Notes:
See FIGS. 5A-5E for Definitions of Tuning Elements.
Example emitters with maximum pressure up to 16 psi and exponent of 0.3.
Other pressures, flows, exponents, materials, or configurations result in different dimensions.

TABLE 5

Example Tuning Element Dimensional Ranges for Five Flow Variants with
Maximum Operating Pressures of 30 psi and Discharge Exponents of 0.3

| | Nominal Emitter Flow Rate (gph) | | | | |
|---|---|---|---|---|---|
| | 0.0675 | 0.135 | 0.2 | 0.27 | 0.54 |
| | Maximum Operating Pressure (psi) | | | | |
| | 30 psi | | | | |
| | Exponent | | | | |
| | 0.3 | | | | |
| (a) Internal Rail - to - Rail Dimension (inches) | 0.120 to 0.070 | | | | |
| (b) Floor thickness (inches) | .004 to .012 | | | | |
| (c) Rail Width (inches) | .010 to 0.030 | | | | |
| (d) Internal Rail Height (inches) | 0.010 to 0.025 | | | | |
| (e) Pressure Responsive Section Length (inches) | 10.6 to 12.9 | 3 to 3.6 | 1.4 to 1.8 | 0.8 to 1 | 0.25 to 0.45 |
| (f) Vertical Rail Gap (inches) | 0 to .006 | | | | |
| (g) Tip Height (inches) | 0.007 to 0.021 | | | | |
| (h) Transverse Rail Gap (inches) | 0.000 to 0.025 | | | | |
| (i) Feature Density (inches) | 0.045 to .07 | 0.06 to .08 | 0.06 to .09 | 0.06 to .1 | 0.08 to .15 |
| (j) Feature Angle | +/−45 degrees | | | | |
| (k) Feature Thickness | 0.010 to 0.030 | | | | |
| (l) Tip clearance (inches) | 0.005 gap, to 0.015 overlap | | 0.015 gap, to 0.015 overlap | | |
| (m) Rail corner (chamfer or radius) (inches) | chamfer - height at rail: 0 to .025, width on floor: 0 to .060 radius: 0 to .025 | | | | |
| (n) Floor profile (inches) | Localized thinning: 0 to .005 Localized thickening: 0 to .005 | | | | |
| (o) Feature Contour | 0.01 inch radius to infinite (i.e. straight, no radius) | | | | |
| Material Hardness | 60 to 80 Shore A Durometer | | | | |

Notes:
See FIGS. 5A-5E for Definitions of Tuning Elements.
Example emitters with maximum pressure up to 30 psi and exponent of 0.3.
Other pressures, flows, exponents, materials, or configurations result in different dimensions.

TABLE 6

Example Tuning Element Dimensional Ranges for Five Flow Variants with
Maximum Operating Pressures of 30 psi and Discharge Exponents of 0

| | Nominal Emitter Flow Rate (gph) | | | | |
|---|---|---|---|---|---|
| | 0.0675 | 0.135 | 0.2 | 0.27 | 0.54 |
| | Maximum Operating Pressure (psi) | | | | |
| | 30 psi | | | | |
| | Exponent | | | | |
| | 0 exp | | | | |
| (a) Internal Rail - to - Rail Dimension (inches) | 0.140 to 0.070 | | | | |
| (b) Floor thickness (inches) | .004 to .012 | | | | |
| (c) Rail Width (inches) | .010 to 0.030 | | | | |
| (d) Internal Rail Height (inches) | 0.010 to 0.025 | | | | |
| (e) Pressure Responsive Section Length (inches) | 27.3 to 33.4 | 7.8 to 9.5 | 3.8 to 4.6 | 2.2 to 2.7 | 0.6 to 1 |
| (f) Vertical Rail Gap (inches) | 0 to .006 | | | | |
| (g) Tip Height (inches) | 0.007 to 0.021 | | | | |
| (h) Transverse Rail Gap (inches) | 0.000 to 0.025 | | | | |
| (i) Feature Density (inches) | 0.045 to .07 | 0.06 to .08 | 0.06 to .09 | 0.06 to .1 | 0.08 to .15 |

TABLE 6-continued

Example Tuning Element Dimensional Ranges for Five Flow Variants with
Maximum Operating Pressures of 30 psi and Discharge Exponents of 0

| | Nominal Emitter Flow Rate (gph) | | | | |
|---|---|---|---|---|---|
| | 0.0675 | 0.135 | 0.2 | 0.27 | 0.54 |
| | Maximum Operating Pressure (psi) | | | | |
| | 30 psi | | | | |
| | Exponent | | | | |
| | 0 exp | | | | |
| (j) Feature Angle | +/−45 degrees | | | | |
| (k) Feature Thickness | 0.010 to 0.030 | | | | |
| (l) Tip clearance (inches) | 0.005 gap, to 0.015 overlap | | 0.015 gap, to 0.015 overlap | | |
| (m) Rail corner (chamfer or radius) (inches) | chamfer - height at rail: 0 to .025, width on floor: 0 to .070 radius: 0 to .025 | | | | |
| (n) Floor profile (inches) | Localized thinning: 0 to .005 Localized thickening: 0 to .005 | | | | |
| (o) Feature Contour | 0.01 inch radius to infinite (i.e. straight, no radius) | | | | |
| Material Hardness | 60 to 80 Shore A Durometer | | | | |

Notes:
See FIGS. 5A-5E for Definitions of Tuning Elements.
Example emitters with maximum pressure up to 30 psi and exponent of 0 or near 0.
Other pressures, flows, exponents, materials, or configurations result in different dimensions.

Figure 32:
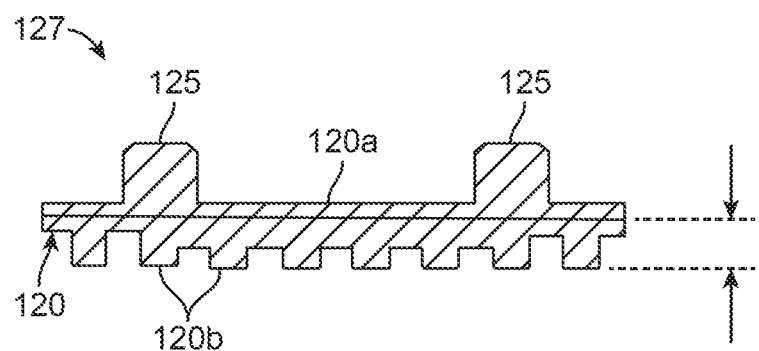
FIG. 32 is a cross sectional view of an example emitter.
Figure 33:
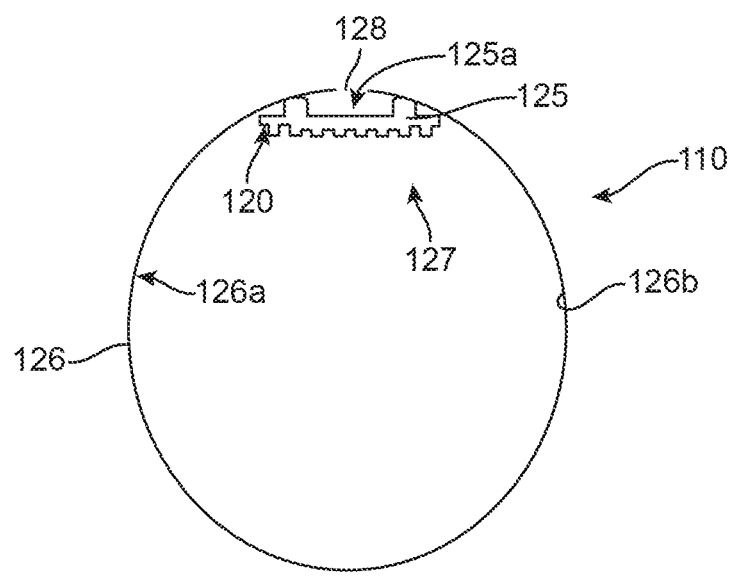
FIG. 33 is a view showing the emitter of FIG. 32 operatively connected to an irrigation lateral.

An example emitter flow path is shown in FIG. 32 and an example emitter flow path operatively connected to an irrigation lateral (e.g., hose or tube) with a lateral flow path is shown in FIG. 33. Although FIG. 32 depicts a two layer construction, it is recognized that construction could be one, two, or more than two layer(s). FIG. 33 shows the lamination of a substrate 120 (emitter) with rails 125 on an inner wall 126a of the lateral 126, thereby forming the irrigation hose 110. The inner wall 126a forms the main water passageway through the hose 110, including the lateral flow path 126b and the emitter flow path 125a. The substrate 120 may be applied as a continuous strip member 127 laminated to the lateral 126 in any suitable manner, such as that disclosed in U.S. Pat. No. 8,469,294. The continuous strip member 127 may be rolled up and stored for later insertion into the hose 110, or the continuous strip member 127 may go right from a mold wheel to the extruder for the lateral 126. That is, the lamination of the rails 125 and substrate 120 (including top surface 120a and fins 120b) from the mold wheel is positioned inside of the die head extruding the lateral 126 thereby forming the irrigation hose 110. Suitable inlets (not shown) allow passage of water from the lateral flow path 126b into the emitter flow path 125a. Suitable outlets 128 are formed in the irrigation hose 110 proximate the outlet section of the substrate 120, by means well known in the art.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A continuous strip emitter, comprising:
 a pressure responsive section including a floor, a first rail, a second rail, and at least two features, the at least two features extending from the floor between the first and second rails, a first feature of the at least two features being tuned by at least a first tuning element to deflect along with at least a portion of the floor and at least a portion of at least one of the first and second rails from a first first feature position to a second first feature position at a range of desired differential pressures local to the first feature, a second feature of the at least two features being tuned by at least a second tuning element different than the at least the first tuning element to deflect along with at least a portion of the floor and at least a portion of at least one of the first and second rails from a first second feature position to a second second feature position at a range of desired differential pressures local to the second feature, the at least the first tuning element being different than the at least the second tuning element in a difference selected from the group consisting of a different type of tuning element, a different configuration of tuning element, a different dimension of tuning element, and a different combination of tuning elements, the tuning elements being selected from the group consisting of rail to rail distance, rail height, rail width, rail radius curvature, rail corner, vertical rail gap, transverse rail gap, external rail, floor thickness, floor profile, tip height, tip clearance, feature density, feature contour, feature angle, and feature thickness, the floor and the first and second rails being subjected to the range of desired differential pressures, the tuning elements tuning the continuous strip emitter in response to pressure increases to create flow versus pressure responses with a desired range of discharge exponents to maintain a desired range of flows over a desired range of operating pressures.

2. The emitter of claim 1, wherein the emitter is operatively connected to a lateral, wherein the at least two features are configured and arranged to deflect toward the lateral at desired differential pressures local to each of the at least two features.

3. The emitter of claim 1, wherein the pressure responsive section is made of a low durometer material.

4. The emitter of claim 1, wherein the pressure responsive section has a length, the length affecting a desired tuning of the at least two features.

5. The emitter of claim 1, wherein the pressure responsive section includes the rail to rail distance defined at least in part by at least one of tapering, angling, and stepping of at least one of the first and second rails, the at least one of tapering, angling, and stepping being linear.

6. The emitter of claim 1, wherein the pressure responsive section includes the rail to rail distance defined at least in part by at least one of tapering, angling, and stepping of at least one of the first and second rails, the at least one of tapering, angling, and stepping being curvilinear.

7. The emitter of claim 1, wherein the pressure responsive section includes the rail to rail distance defined at least in part by at least one of tapering, angling, and stepping of at least one of the first and second rails, the at least one of tapering, angling, and stepping being continuous.

8. The emitter of claim 1, wherein the pressure responsive section includes the rail to rail distance defined at least in part by at least one of tapering, angling, and stepping of at least one of the first and second rails, the at least one of tapering, angling, and stepping being discontinuous.

9. The emitter of claim 1, wherein the pressure responsive section includes at least one external rail, the at least one external rail being tuned by at least one of length, position, number, distance from at least one of the first and second rails, number of times the at least one external rail co-merges with at least one of the first rail and the second rail, thickness, tapering, angling, tapering, symmetry, and continuity.

10. The emitter of claim 1, wherein the desired range of discharge exponents for the emitter is 0 to 0.7 and the desired range of operating pressures is 4 to 30 psi.

11. The emitter of claim 1, wherein the rail corner is at least one of an internal rail corner and an external rail corner.

12. The emitter of claim 1, wherein the first feature is operatively connected to the floor proximate the first rail and the second feature is operatively connected to the floor proximate the second rail, wherein the first and second features are positioned along the pressure responsive section and deflect independently from one another, at least the first tuning element and at least the second tuning element being non-symmetrical along the pressure responsive section.

13. The emitter of claim 1, wherein the first feature and the second feature are positioned along the pressure responsive section and deflect independently from one another, at least the first tuning element and at least the second tuning element having at least one of different dimensions and different configurations.

14. A combination irrigation lateral and emitter, comprising:
 a lateral having a wall with an inner wall, at least a portion of the inner wall defining a lateral flow path;
 a continuous strip emitter having a first rail and a second rail operatively connected to the inner wall and a floor interconnecting distal ends of the first and second rails, the inner wall, the first and second rails, and the floor defining an emitter flow path, the emitter comprising:
  a pressure responsive section including portions of the floor, the first rail, and the second rail and including at least two features extending from the floor between the first and second rails, a first feature of the at least two features being tuned by at least a first tuning element to deflect along with the at least a portion of the floor and at least a portion of at least one of the first and second rails from a first first feature position to a second first feature position at a range of desired differential pressures local to the at least one feature, a second feature of the at least two features being tuned by at least a second tuning element different than the first tuning element to deflect along with at least a portion of the floor and at least a portion of at least one of the first and second rails from a first second feature position to a second second feature position at a range of desired differential pressures local to the second feature, the at least the first tuning element being different than the at least the second tuning element in a difference selected from the group consisting of a different type of tuning element, a different configuration of tuning element, a different dimension of tuning element, and a different combination of tuning elements, the tuning elements being selected from the group consisting of rail to rail distance, rail height, rail width, rail radius curvature, rail corner, vertical rail gap, transverse rail gap, external rail, floor thickness, floor profile, tip height, tip clearance, feature density, feature contour, feature angle, and feature thickness, the floor and the first and second rails being subjected to the desired differential pressures, the tuning elements tuning the continuous strip emitter in response to pressure increases to create flow versus pressure responses with a desired range of discharge exponents to maintain a desired range of flows over a desired range of operating pressures;
  wherein the desired range of discharge exponents for the emitter is 0 to 0.7, wherein the desired range of operating pressures is 4 to 30 psi, and wherein the at least one feature deflects from the first position into a second position when the range of desired differential pressures is local to the at least one feature.

15. The combination irrigation lateral and emitter of claim 14, wherein the pressure responsive section is made of a low durometer material.

16. The combination irrigation lateral and emitter of claim 14, wherein the pressure responsive section has a length, the length affecting a desired tuning of the at least one feature.

17. The combination irrigation lateral and emitter of claim 14, wherein the pressure responsive section includes the rail to rail distance defined at least in part by at least one of tapering, angling, and stepping of at least one of the first and second rails, the at least one of tapering, angling, and stepping being linear.

18. The combination irrigation lateral and emitter of claim 14, wherein the pressure responsive section includes the rail to rail distance defined at least in part by at least one of tapering, angling, and stepping of at least one of the first and second rails, the at least one of tapering, angling, and stepping being curvilinear.

19. The combination irrigation lateral and emitter of claim 14, wherein the pressure responsive section includes the rail to rail distance defined at least in part by at least one of tapering, angling, and stepping of at least one of the first and second rails, the at least one of tapering, angling, and stepping being continuous.

20. The combination irrigation lateral and emitter of claim 14, wherein the pressure responsive section includes the rail to rail distance defined at least in part by at least one of tapering, angling, and stepping of at least one of the first and second rails, the at least one of tapering, angling, and stepping being discontinuous.

21. The combination irrigation lateral and emitter of claim 14, wherein the pressure responsive section includes at least one external rail, the at least one external rail being tuned by at least one of length, position, number, distance from at least one of the first and second rails, number of times the at least one external rail co-merges with at least one of the first rail and the second rail, thickness, tapering, angling, tapering, symmetry, and continuity.

22. The combination irrigation lateral and emitter of claim 14, wherein the rail corner is at least one of an internal rail corner and an external rail corner.

23. The combination irrigation emitter of claim 14, wherein the first feature is operatively connected to the floor proximate the first rail and the second feature is operatively connected to the floor proximate the second rail, wherein the first and second features are positioned along the pressure responsive section and deflect independently from one another, at least the first tuning element and at least the second tuning element being non-symmetrical along the pressure responsive section.

24. The combination irrigation lateral and emitter of claim 14, wherein the first feature and the second feature are positioned along the pressure responsive section and deflect independently from one another, at least the first tuning element and at least the second tuning element having at least one of different dimensions and different configurations.

25. The combination irrigation lateral and emitter of claim 14, wherein the wall of the lateral includes a perimeter selected from the group consisting of a continuous perimeter and a discontinuous perimeter formed by seaming the wall in at least one location of the perimeter.

26. The emitter of claim 1, wherein the first and second rails have internal rail heights of 0.010 to 0.025 inch.

27. The emitter of claim 1, wherein the pressure responsive section has a constant flow path length.

28. The emitter of claim 1, wherein at least one of the at least two features interconnects the floor and at least one of the first and second rails.

29. The combination irrigation lateral and emitter of claim 14, wherein at least one of the at least two features interconnects the floor and at least one of the first and second rails.

30. The emitter of claim 1, further comprising the pressure responsive section being at least one pressure responsive section positioned between an inlet section and an outlet section of the continuous strip emitter, wherein the floor extends along the inlet section, the pressure responsive section, and the outlet section, and wherein the first and second rails extend along at least the pressure responsive and outlet sections.

31. The combination irrigation lateral and emitter of claim 14, further comprising the pressure responsive section being at least one pressure responsive section positioned between an inlet section and an outlet section of the continuous strip emitter, the inlet being in fluid communication with the lateral flow path, the outlet being in fluid communication with an outlet aperture in the lateral, wherein the floor extends along the inlet section, the pressure responsive section, and the outlet section, and wherein the first and second rails extend along at least the pressure responsive and outlet sections.

* * * * *